(12) United States Patent
Jeon et al.

(10) Patent No.: US 11,392,571 B2
(45) Date of Patent: Jul. 19, 2022

(54) KEY-VALUE STORAGE DEVICE AND METHOD OF OPERATING THE SAME

(71) Applicant: SAMSUNG ELECTRONICS CO., LTD., Suwon-si (KR)

(72) Inventors: Je-Kyeom Jeon, Siheung-si (KR); Jae-Ju Kim, Suwon-si (KR); Dong-Ju Roh, Uiwang-si (KR); Sang-Yoon Oh, Suwon-si (KR); Byung-Ki Lee, Hwaseong-si (KR); Sung-Kug Cho, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 699 days.

(21) Appl. No.: 16/021,960

(22) Filed: Jun. 28, 2018

(65) Prior Publication Data

US 2019/0138612 A1     May 9, 2019

(30) Foreign Application Priority Data

Nov. 8, 2017    (KR) ........................ 10-2017-0148316

(51) Int. Cl.
*G06F 7/00*          (2006.01)
*G06F 16/22*        (2019.01)
*G06F 16/27*        (2019.01)

(52) U.S. Cl.
CPC ........ *G06F 16/2255* (2019.01); *G06F 16/221* (2019.01); *G06F 16/27* (2019.01)

(58) Field of Classification Search
CPC ..... G06F 16/221; G06F 16/2255; G06F 16/27

USPC ................................. 707/736, 741, 747, 758
See application file for complete search history.

(56) References Cited

U.S. PATENT DOCUMENTS

| | | | |
|---|---|---|---|
| 5,897,637 A | 4/1999 | Guha | |
| 7,814,129 B2 | 10/2010 | Williams | |
| 7,827,182 B1* | 11/2010 | Panigrahy | ............... G06F 16/10 707/747 |
| 8,620,884 B2 | 12/2013 | Calder et al. | |
| 8,788,543 B2 | 7/2014 | Mckenney et al. | |
| 8,874,505 B2 | 10/2014 | Lin et al. | |
| 8,996,535 B1 | 3/2015 | Kimmel et al. | |
| 9,002,907 B2 | 4/2015 | San Martin et al. | |
| 9,292,560 B2 | 3/2016 | Attaluri et al. | |
| 9,298,604 B2 | 3/2016 | Sengupta et al. | |
| 9,384,145 B2 | 7/2016 | Gura et al. | |
| 9,438,426 B2* | 9/2016 | Li | ......................... H04L 9/0894 |
| 2012/0102298 A1 | 4/2012 | Sengupta et al. | |
| 2013/0275656 A1* | 10/2013 | Talagala | .............. G06F 12/0246 711/103 |

(Continued)

*Primary Examiner* — Md I Uddin
(74) *Attorney, Agent, or Firm* — Volentine, Whitt & Francos, PLLC

(57) ABSTRACT

A key-value storage device includes a non-volatile memory and a controller. The key-value storage device is configured to communicate with a host and includes a controller and a non-volatile memory. The controller is configured to receive, from the host, a first command including a key, a first chunk among multiple chunks included in a value corresponding to the key, and a first chunk index corresponding to the first chunk. The controller is configured to store mapping information of the first chunk in a mapping table based on the key and the first chunk index. The non-volatile memory is configured to store the key and the first chunk based on the mapping information.

8 Claims, 26 Drawing Sheets

(56) References Cited

U.S. PATENT DOCUMENTS

| | | |
|---|---|---|
| 2015/0358158 A1* | 12/2015 | Fadaie ................. H04L 67/104 |
| | | 713/171 |
| 2016/0103623 A1 | 4/2016 | Choi et al. |
| 2017/0124104 A1 | 5/2017 | Smith et al. |
| 2017/0161397 A1 | 6/2017 | Choi et al. |
| 2017/0177573 A1 | 6/2017 | Bordawekar et al. |
| 2017/0199925 A1 | 7/2017 | Barry |
| 2018/0089188 A1* | 3/2018 | Kharisma ........... G06F 16/2477 |

\* cited by examiner

| KEY | VALUE | CHUNK | CHUNK INDEX |
|---|---|---|---|
| KEY1 | V1 | CHUNK0 | CI0 |
| | | CHUNK1 | CI1 |
| | | CHUNK2 | CI2 |
| | | CHUNK3 | CI3 |
| KEY2 | V2 | CHUNK0 | CI0 |
| | | CHUNK1 | CI1 |
| | | CHUNK2 | CI2 |
| KEY3 | V3 | - | - |

FIG. 18B

HASH ENTRY

HI | PPN | BITMAP | HASH TAG

FIG. 18C

BUCKET ENTRY

BI | PPN | BITMAP | BUCKET TAG

KEY-VALUE STORAGE DEVICE AND METHOD OF OPERATING THE SAME

CROSS-REFERENCE TO RELATED APPLICATION

This U.S. non-provisional patent application claims the benefit of priority under 35 U.S.C. § 119 to Korean Patent Application No. 10-2017-0148316, filed on Nov. 8, 2017 in the Korean Intellectual Property Office, the disclosure of which is incorporated herein in its entirety by reference.

BACKGROUND

1. Technical Field

The present disclosure relates to a storage device. More particularly, the present disclosure relates to a key-value storage device and a method of operating the same.

2. Description of the Related Art

Storage may be classified into object-based storage and block-based storage according to a unit of managing data. Object-based storage is a storage architecture that stores and manages data as objects. Objects may be data that may have an arbitrary size and may be, for example, files, multimedia data such as moving images or images, or the like. The object-based storage may be used to manage such objects. An example of and object-based storage device is a key-value storage device.

SUMMARY

According to an aspect of the present disclosure, a key-value storage device configured to communicate with a host includes a controller and a non-volatile memory. The controller is configured to receive, from the host, a first command including a key, a first chunk among multiple chunks included in a value corresponding to the key, and a first chunk index corresponding to the first chunk. The controller is also configured to store mapping information of the first chunk in a mapping table based on the key and the first chunk index. The non-volatile memory is configured to store the key and the first chunk based on the mapping information.

According to another aspect of the present disclosure, a key-value storage device includes a non-volatile memory and a controller configured to control the non-volatile memory. A method of operating the key-value storage device includes receiving, by the controller from a host, a first command including a key, a first chunk among multiple chunks included in a value corresponding to the key, and a first chunk index corresponding to the first chunk. The method also includes generating, by the controller, a first mapping index for storing mapping information of the first chunk based on the key and the first chunk index, in response to the first command. The method further includes storing, by the controller in a mapping table, a first physical address used to write the first chunk on the non-volatile memory according to the first mapping index. The method moreover includes writing the first chunk on the first physical address of the non-volatile memory by referring to the mapping table.

According to another aspect of the present disclosure, a key-value storage device includes a memory including a first area and a second area. A method of operating the key-value storage device includes assigning, to the first area, a hash table including multiple groups each including multiple hash entries; assigning, to the second area, a bucket table including multiple buckets respectively corresponding to the multiple groups and each including at least one bucket entry. When a number of hash entries corresponding to a first hash index and assigned to a first group among the multiple groups is greater than a threshold number, the method also includes storing a new hash entry, corresponding to the first hash index and assigned to the first group, in a first bucket corresponding to the first group. The first bucket is selected from among the multiple buckets.

BRIEF DESCRIPTION OF THE DRAWINGS

Embodiments of the present disclosure will be more clearly understood from the following detailed description taken in conjunction with the accompanying drawings in which:

FIG. 18B illustrates a hash entry according to an embodiment;

FIG. 18C illustrates a bucket entry according to an embodiment;

DETAILED DESCRIPTION OF THE EMBODIMENTS

Hereinafter, inventive concepts of the present disclosure will now be described more fully with reference to the accompanying drawings, in which exemplary embodiments of the present disclosure are shown.

Figure 1:
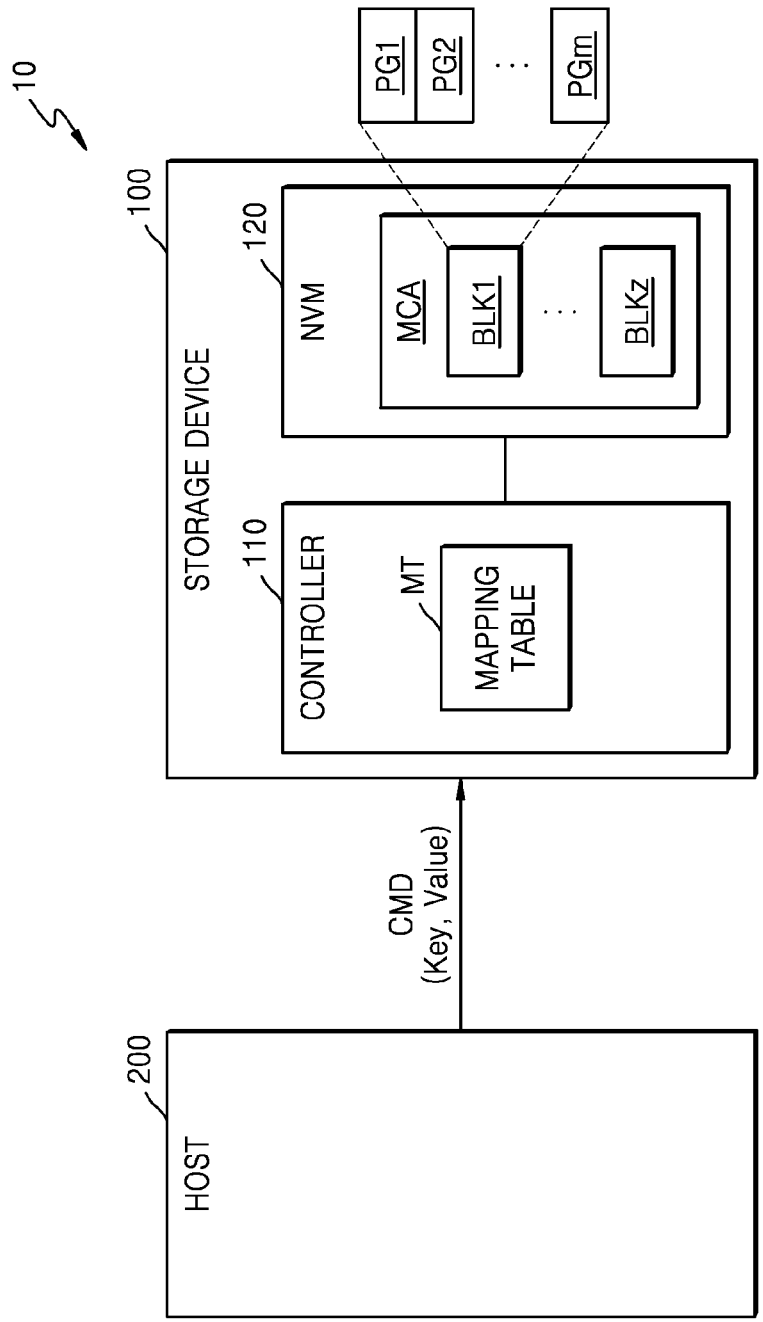
FIG. 1 illustrates a block diagram of a storage system according to an embodiment.

FIG. 1 illustrates a block diagram of a storage system 10 according to an embodiment.

Referring to FIG. 1, the storage system 10 may include a storage device 100 and a host 200. The storage device 100 may include a controller 110 and a non-volatile memory, i.e., NVM 120. The host 200 may communicate with the storage device 100 by using various interfaces. For example, the host 200 may be embodied as an Application Processor (AP) or a System on Chip (SoC).

In an embodiment, the storage device 100 may be a key-value storage device or key-value store or may be, for example, a key-value Solid State Drive (SSD). The key-value storage device quickly and simply processes data by using key-value pairs. Here, a "key-value pair" denotes a pair of a key having uniqueness and a value that is data corresponding to the key, and may be referred to as a "tuple" or "key-value tuple". In the key-value pair, the key may be represented as an arbitrary string such as a file name, a Uniform Resource Identifier (URI), or a hash. The value may be an arbitrary type of data such as an image, a user preference file, or a document. In this case, sizes of the key and the value are variable. For example, a size of the value may change according to data included in the value.

Hereinafter, an embodiment in which the storage device 100 is a key-value storage device will be mainly described. In the present specification, the storage device 100 may be substantially the same as a key-value storage device or a key-value store. However, the storage device 100 is not limited to a key-value storage device and may be applied to an arbitrary object cache system or object storage system that manages data in units of objects. Therefore, the storage device 100 may arbitrarily manage data in units of objects instead of using key-values pairs.

In an embodiment, the host 200 may transmit, to the storage device 100, a command CMD, for example, a write request or a put command, which includes a key-value pair. The storage device 100 may write a value on the NVM 120 in response to the command CMD. In an embodiment, the host 200 may transmit, to the storage device 100, a command CMD, for example, a read request or a get command, which includes a key. The storage device 100 may read the value corresponding to the key from the NVM 120 in response to the command CMD. In this case, the host 200 may not convert the key into a Logical Block Address (LBA) unit having a fixed size and may generate a command CMD including a key having a variable size, thus transmitting the generated command CMD to the storage device 100.

The controller 110 may control the NVM 120 such that the value may be written on the NVM 120 in response to a write request from the host 200, or the value stored in the NVM 120 may be read in response to a read request from the host 200. In the present embodiment, the controller 110 may include a mapping table MT in which multiple pieces of mapping data are stored. For example, the mapping table MT may be loaded to a memory such as Dynamic Random-Access Memory (DRAM) or Static RAM (SRAM). FIG. 1 illustrates that the mapping table MT is included in the controller 110, but one or more embodiments of the present disclosure are not limited thereto. In some embodiments, the mapping table MT may be loaded to a memory chip outside a controller chip in which the controller 110 is embodied. Hereinafter, referring to FIG. 2A, the mapping table MT will be described in more detail.

Figure 2A:
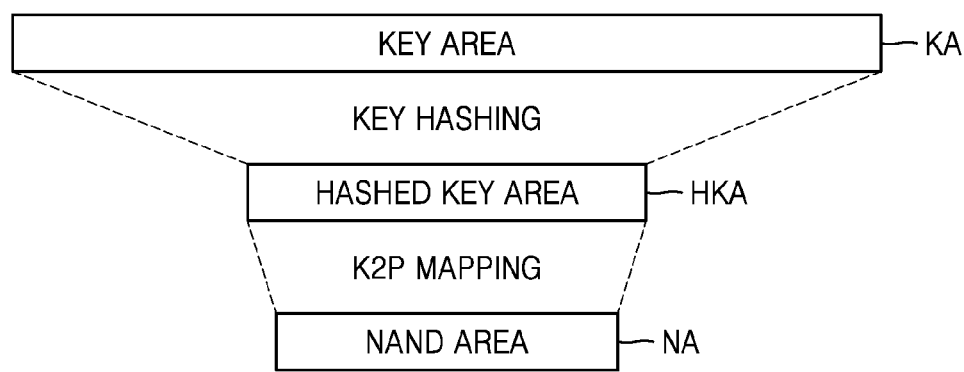
FIG. 2A illustrates a key area, a hashed key area, and a negative-AND (NAND) area, according to an embodiment.

FIG. 2A illustrates a key area KA, a hashed key area HKA, and a negative-AND (NAND) area NA, according to an embodiment.

Referring to FIGS. 1 and 2A, the host 200 may receive/transmit key data defined in the key area KA from/to the storage device 100. A size of the key data may be variable and may be large enough to raise concerns to be addressed according to embodiments. Since the mapping table MT is loaded to a memory having limited capacity, it may be difficult to store the key data in the memory when the size of the key data is large enough to raise concerns to be addressed as described herein. Therefore, the controller 110 may perform a hashing operation on the key data defined in the key area KA and thus may generate a hashed key in the hashed key area HKA.

In the mapping table MT, the generated hashed key is used as a mapping index, i.e., a hash index, and the mapping data may be stored for each mapping index. In the present specification, unless otherwise defined, the mapping index may be substantially the same as the hash index. The mapping data may include a physical address for storing the value in a non-volatile memory, e.g., the NAND area NA, of the storage device 100. As described, the mapping data may indicate the hashed key and the physical address, e.g., a corresponding relationship of a Physical Page Number (PPN), and thus, the mapping table MT may be referred to as a Key-to-PPN (K2P) mapping table.

For example, as a result of performing a hashing operation on each of first key data and second key data, an identical first hashed key, that is, an identical first mapping index, may be generated. In the mapping table MT, when a physical address of a first value corresponding to the first key data corresponding to the first mapping index is stored in advance, a physical address of a second value corresponding to the second key data corresponding to another mapping index different from the first mapping index may also be stored. As described above, a case where an identical hashed key is generated as a result of a hashing operation on pieces of key data may be referred to as a "hashing collision". In an embodiment, the controller 110 may determine a collision limit corresponding to a limit on the number of hashing collisions. A term used later to describe the prospect of hashing collisions over the collision limit is "over collisions". The collision limit may be a threshold determined in advance for hashing collisions which result in the identical hashed key. In this case, solutions are needed for when hashing collisions over the collision limit occur.

Referring back to FIG. 1, the NVM 120 may include a memory cell array MCA, and the memory cell array MCA may include memory blocks BLK1 to BLKz. The memory block BLK1 may include pages PG1 to PGm, where z and m may each be a positive integer and may vary according to embodiments. For example, a memory block may be an erase unit, and a page may be a write and read unit. In some embodiments, the memory cell array MCA may include planes, dies, or chips. In an embodiment, the NVM 120 may include a flash memory device, for example, a NAND flash memory device. However, one or more embodiments of the present disclosure are not limited thereto. The NVM 120 may include a resistive memory device such as resistive RAM (ReRAM), phase change RAM (PRAM), or magnetic RAM (MRAM).

Figure 2B:
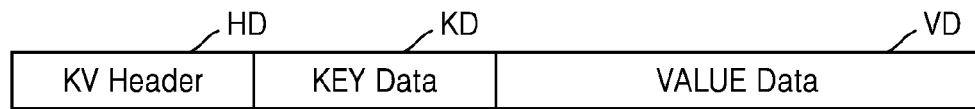
FIG. 2B illustrates key-value data stored in a non-volatile memory, according to an embodiment.

FIG. 2B illustrates key-value data stored in the NVM 120, according to an embodiment.

Referring to FIGS. 1 and 2B, the key-value data stored in the NVM 120 may include a key-value header HD, key data KD, and value data VD. As described above with reference to FIG. 2A, since it is impossible to store all pieces of the key data KD in a memory, e.g., DRAM, due to a variable size of the key data KD, the key data KD may be stored in the NVM 120 together with the value data VD.

When a read request including a key is received from the host 200, the controller 110 may generate a hashed key from the key. In this case, in the mapping table MT, multiple pieces of the mapping data corresponding to the identical hashed key may be stored within a range of limit values of hashing collisions. Thus, the controller 110 may control various read operations performed on the NVM 120 according to the pieces of the mapping data to thereby determine the key data KD. In this case, in order to reduce the number of times that read operations are performed on the NVM 120, the NVM 120 may collect and store the key data KD and the value data VD. For example, the key-value header HD may store meta data, for example, a size of the key data KD or value data VD and may distinguish the key data KD and the value data VD from each other by using the key-value header HD.

Referring back to FIG. 1, the storage system 10 may be embodied as, for example, a Personal Computer (PC), a data server, Network-Attached Storage (NAS), an Internet of Things (JOT) device, or a portable electronic device. The portable electronic device may be a laptop computer, a mobile phone, a smart phone, a tablet PC, a Personal Digital Assistant (PDA), an Enterprise Digital Assistant (EDA), a digital still camera, a digital video camera, an audio device, a Portable Multimedia Player (PMP), a Personal Navigation Device (PND), an MP3 player, a handheld game console, an e-book reader, a wearable device, or the like.

In some embodiments, the storage device 100 may be a memory embedded in an electronic device. For example, the storage device 100 may be an SSD, an embedded Universal Flash Storage (UFS) memory device, or an embedded Multi-Media Card (eMMC). In some embodiments, the storage device 100 may be an external memory detachably attached to the electronic device. For example, the storage device 100 may be a UFS memory card, a Compact Flash (CF) card, a Secure Digital (SD) card, a Micro Secure Digital (Micro-SD) card, a Mini Secure Digital (Mini-SD) card, an extreme Digital (xD) card, or a memory stick.

Figure 3:
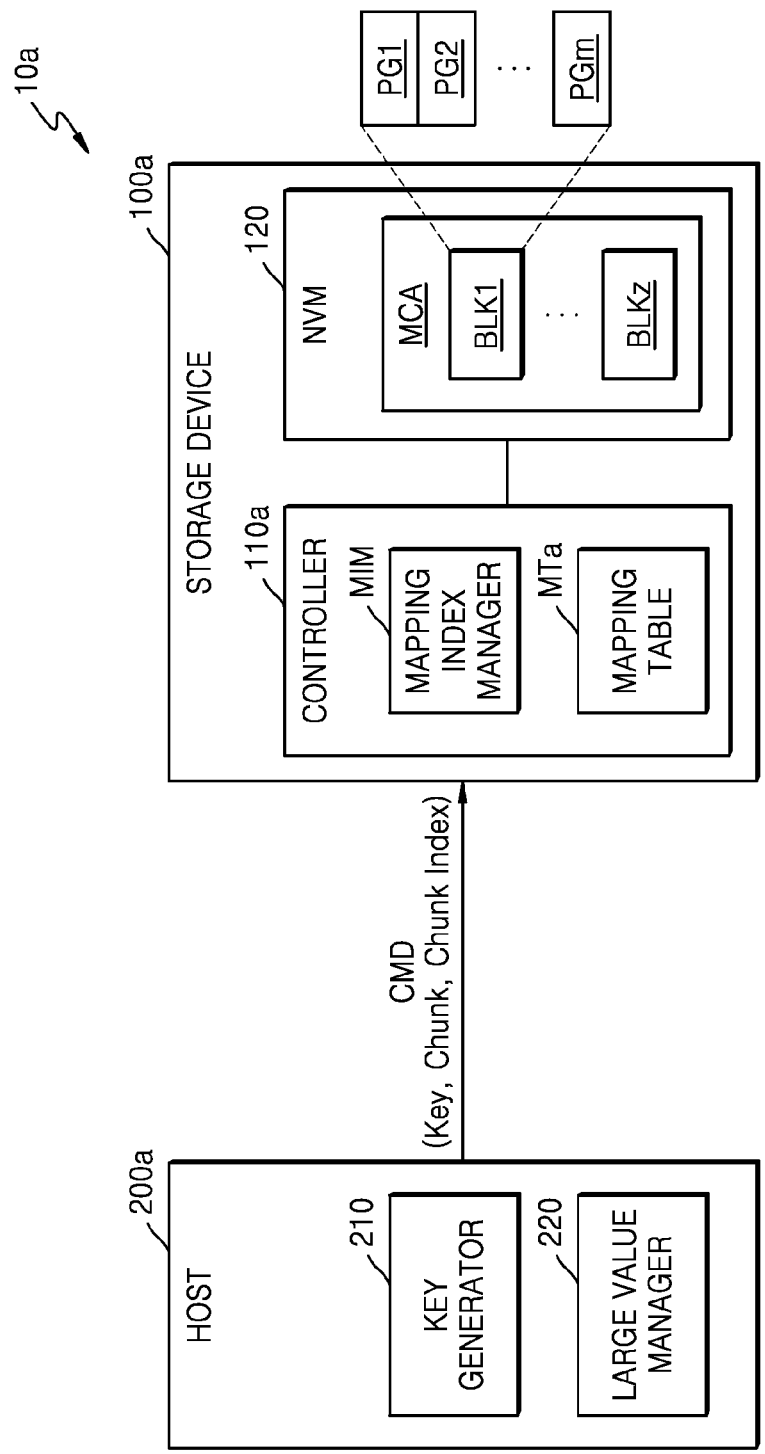
FIG. 3 illustrates a block diagram of a storage system according to an embodiment.

FIG. 3 illustrates a block diagram of a storage system 10a according to an embodiment. The storage system 10a according to the present embodiment may be an example of the storage system 10 of FIG. 1, and the descriptions provided with reference to FIGS. 1 to 2B may be applied to the present embodiment. Thus, repeated descriptions will be omitted herein.

Referring to FIG. 3, a host 200a may include a key generator 210 and a large value manager 220. The key generator 210 may generate keys having variable sizes. A large value may have a size greater than a threshold value, e.g., a predetermined threshold value. The large value manager 220 may divide a large value into chunks and may generate chunk indices respectively corresponding to the chunks. Here, the 'large value' may be defined as a value having a greater size than a write unit of the NVM 120. The 'threshold value' may correspond to, e.g., a size of, the write unit of the NVM 120. For example, the threshold value may correspond to a size of a page corresponding to a PPN. For example, the threshold value may correspond to a value obtained by multiplying the size of the page by the number of planes included in the NVM 120. For example, the threshold value may correspond to a value obtained by multiplying the size of the page by the number of cores included in a controller 110a (e.g., a processor 111 of FIG. 8 described later). Hereinafter, the large value and the chunks will be described with reference to FIG. 4.

Figures 4, 5:
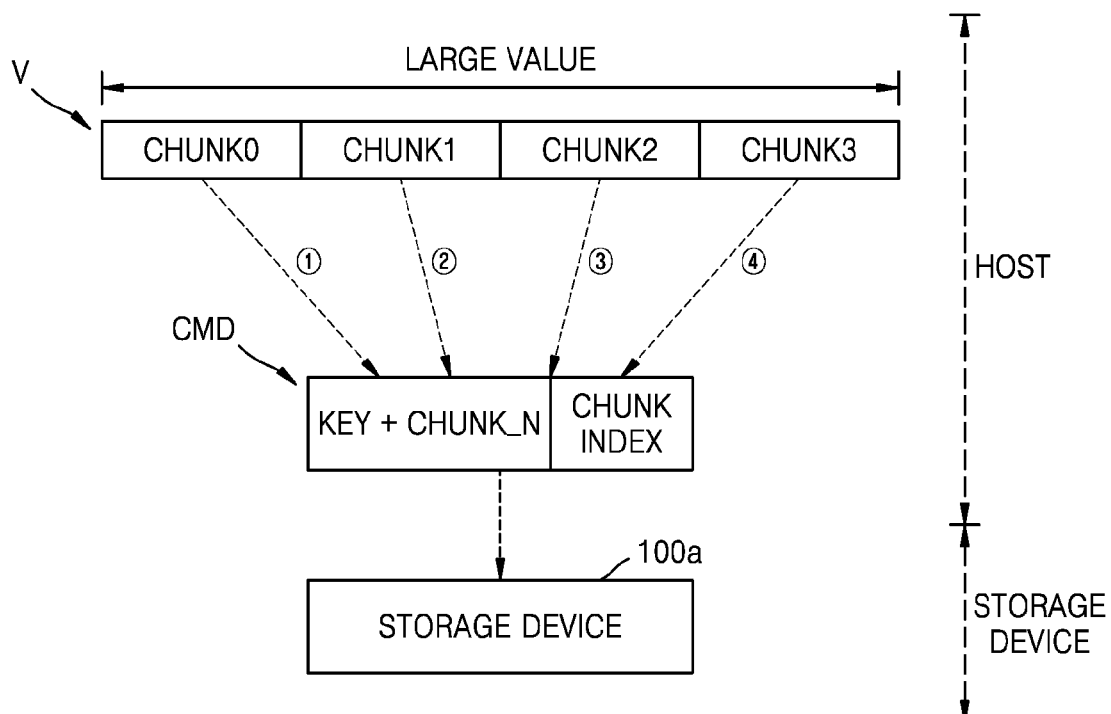
FIG. 4 illustrates a table for explaining keys, values, chunks, and chunk indices, according to an embodiment.
FIG. 5 illustrates a large value management operation according to an embodiment.

FIG. 4 illustrates a table 40 for explaining keys, values, chunks, and chunk indices, according to an embodiment.

Referring to FIGS. 3 and 4, the host 200a may generate a first key KEY1 and a first value V1 corresponding to the first key KEY1. When a size of the first value V1 is greater than a threshold value, the large value manager 220 may divide the first value V1 into first chunk CHUNK0 to fourth chunk CHUNK3, and may assign first index CI0 to fourth chunk index CI3 to the first chunk CHUNK0 to fourth chunk CHUNK3, respectively. In this case, a size of each of the first chunk CHUNK0 to fourth chunk CHUNK3 may be determined based on, e.g., a size of, the write unit of the NVM 120, for example, the size of the page. For example, the sizes of the first chunk CHUNK0 to fourth chunk CHUNK3 may each be less than or equal to the size of the page and may be the same. However, one or more embodiments are not limited thereto. The sizes of the first chunk CHUNK0 to fourth chunk CHUNK3 may differ from each other.

Also, the host 200a may generate a second key KEY2 and a second value V2 corresponding to the second key KEY2. When a size of the second value V2 is greater than the threshold value, the large value manager 220 may divide the second value V2 into the first chunk CHUNK0 to third chunk CHUNK2. In this case, the large value manager 220 may assign the first chunk index CI0 to third chunk index CI2 to the first chunk CHUNK0 to third chunk CHUNK2, respectively. In this case, the size of the second value V2 may be less than that of the first value V1. Accordingly, the number of chunks included in the second value V2 may be less than the number of chunks included in the first value V1.

In addition, the host 200a may generate a third key KEY3 and a third value V3 corresponding to the third key KEY3. When a size of the third value V3 is less than or equal to the threshold value, the large value manager 220 may not divide the third value V3 into units of chunks, and the host 200a may transmit a command CMD including the third key KEY3 and the third value V3 to a storage device 100a.

FIG. 5 illustrates a large value management operation according to an embodiment.

Referring to FIGS. 3 and 5, the large value manager 220 included in the host 200a may divide a large value V into the first chunk CHUNK0 to fourth chunk CHUNK3, and for example, the large value V may correspond to the first value V1 of FIG. 4. The host 200a may sequentially transmit, to the storage device 100a, command CMD in a number corresponding to the number of chunks included in the large value V. The command CMD may include a key, an $N^{th}$ chunk CHUNK_N among the chunks included in the value corresponding to the key, and a chunk index corresponding to the $N^{th}$ chunk CHUNK_N.

Figure 6:
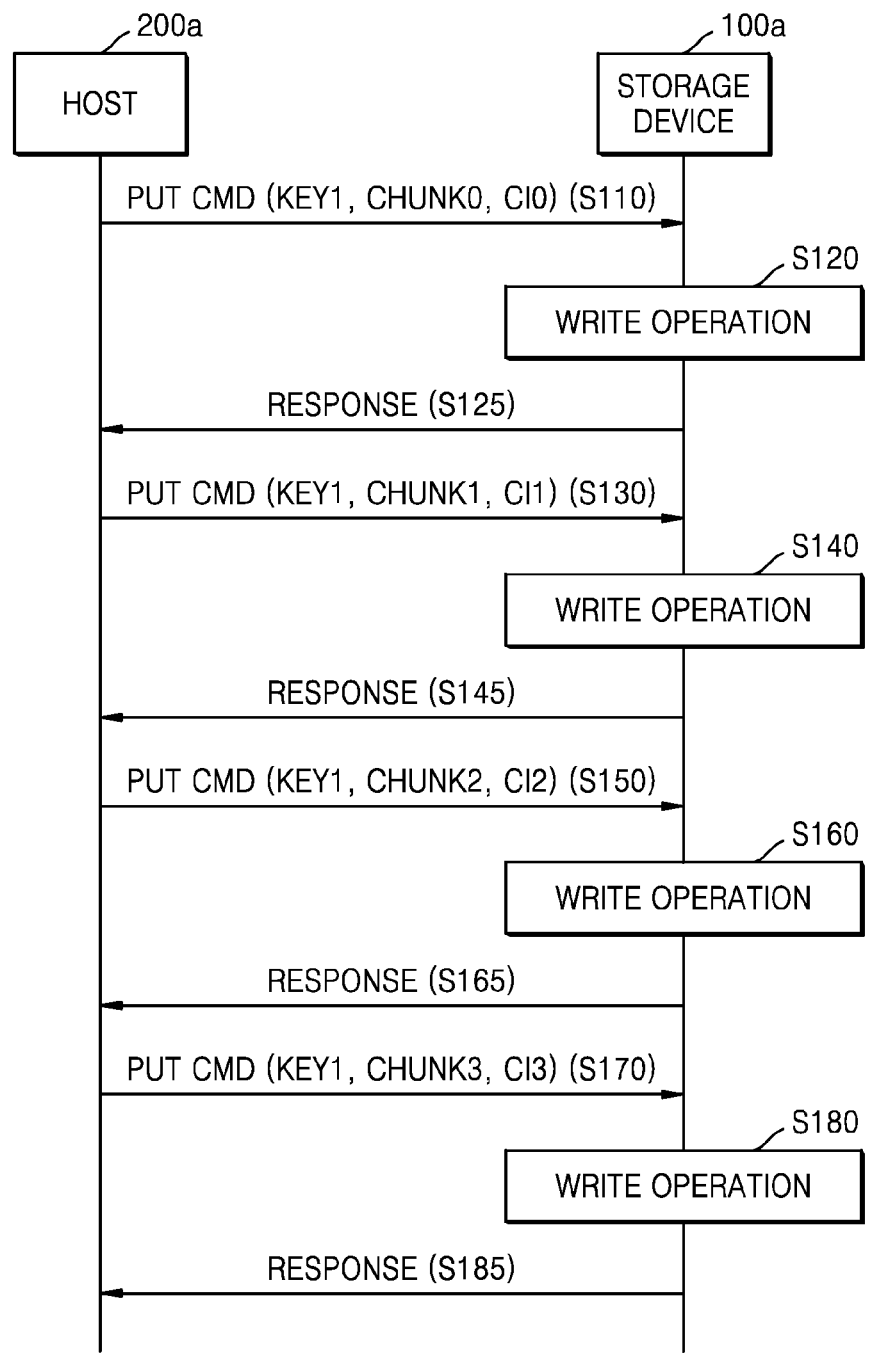
FIG. 6 illustrates a flowchart of a method of operating a storage system, according to an embodiment.

FIG. 6 illustrates a flowchart of a write operation between the host 200a and the storage device 100a, according to an embodiment. For example, the write operation according to an embodiment may correspond to an operation of writing the first key KEY1 and the first value V1 of FIG. 4 on the storage device 100a. Hereinafter, the write operation will be described with reference to FIGS. 3 to 6.

In operation S110, the host 200a transmits, to the storage device 100a, a command, for example, a put command PUT CMD, which includes the first key KEY1, the first chunk CHUNK0, and the first chunk index CI0. In operation S120, the storage device 100a performs the write operation on the first chunk CHUNK0 based on the first key KEY1 and the first chunk index CI0. In operation S125, the storage device 100a transmits, to the host 200a, a response message indicating that the write operation on the first chunk CHUNK0 has completed. In operation S130, the host 200a transmits, to the storage device 100a, a put command PUT CMD including the first key KEY1, the second chunk CHUNK1, and the second chunk index CI1. In operation S140, the storage device 100a performs a write operation on the second chunk CHUNK1 based on the first key KEY1 and the second chunk index CI1. In operation S145, the storage device 100a transmits, to the host 200a, a response message indicating that the write operation on the second chunk CHUNK1 has completed.

In operation S150, the host 200a transmits, to the storage device 100a, a put command PUT CMD including the first key KEY1, the third chunk CHUNK2, and the third chunk index CI2. In operation S160, the storage device 100a performs a write operation on the third chunk CHUNK2 based on the first key KEY1 and the third chunk index CI2. In operation S165, the storage device 100a transmits, to the host 200a, a response message indicating that the write operation on the third chunk CHUNK2 has completed. In operation S170, the host 200a transmits, to the storage device 100a, a put command PUT CMD including the first key KEY1, the fourth chunk CHUNK3, and the fourth chunk index CI3. In operation S180, the storage device 100a performs a write operation on the fourth chunk CHUNK3 based on the first key KEY1 and the fourth chunk index CI3. In operation S185, the storage device 100a transmits, to the host 200a, a response message indicating that the write operation on the fourth chunk CHUNK3 has completed.

As set forth above for FIG. 6, write operations are iteratively performed after each put command, and a response is sent by the storage device 100a after each write operation.

Figure 7:
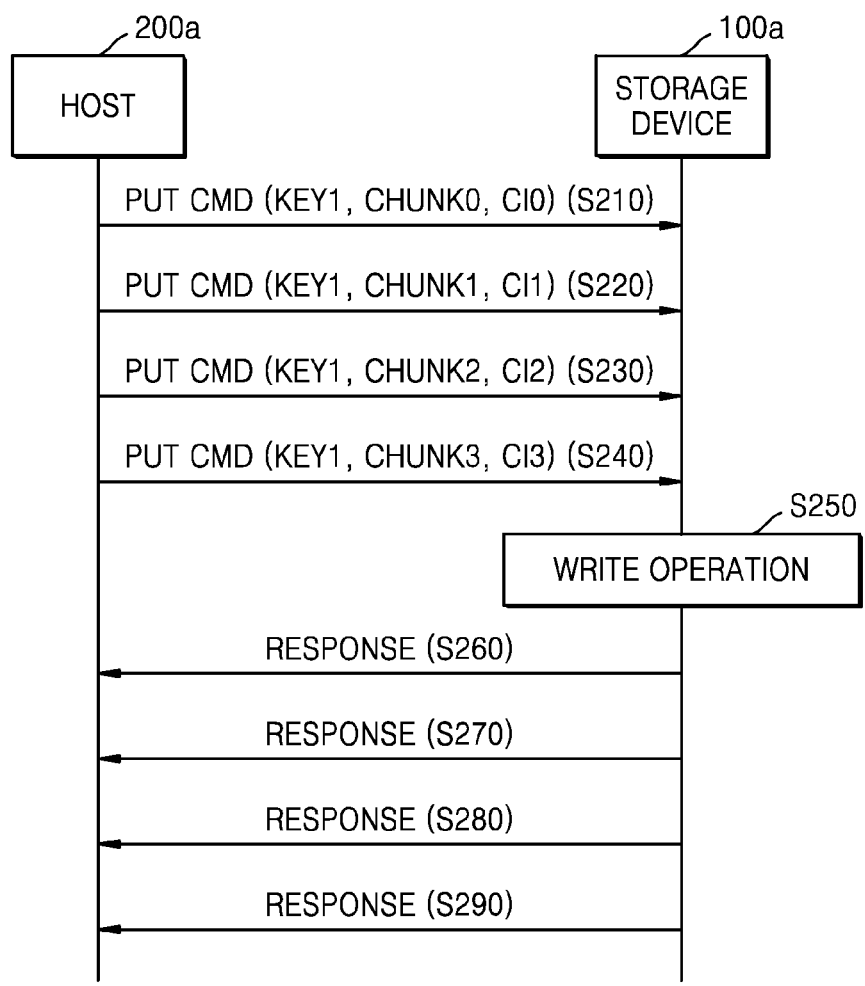
FIG. 7 illustrates a flowchart of another example of a method of operating a storage system, according to an embodiment.

FIG. 7 illustrates a flowchart of another example of the write operation between the host 200a and the storage device 100a, according to an embodiment. For example, the write operation according to the present embodiment may correspond to the operation of writing the first key KEY1 and the first value V1 of FIG. 4 on the storage device 100a. Hereinafter, the write operation will be described with reference to FIGS. 3 to 5 and 7.

In operation S210, the host 200a transmits, to the storage device 100a, the put command PUT CMD including the first key KEY1, the first chunk CHUNK0, and the first chunk index CI0. In operation S220, the host 200a transmits, to the storage device 100a, the put command PUT CMD including the first key KEY1, the second chunk CHUNK1, and the second chunk index CI1. In operation S230, the host 200a transmits, to the storage device 100a, the put command PUT CMD including the first key KEY1, the third chunk CHUNK2, and the third chunk index CI2. In operation S240, the host 200a transmits, to the storage device 100a, the put command PUT CMD including the first key KEY1, the fourth chunk CHUNK3, and the fourth chunk index CI3.

In operation S250, the storage device 100a sequentially performs the write operations on the first chunk CHUNK0 to fourth chunk CHUNK3. In operation S260, the storage device 100a transmits, to the host 200a, the response message indicating that the write operation on the first chunk CHUNK0 has completed. In operation S270, the storage device 100a transmits, to the host 200a, the response message indicating that the write operation on the second chunk CHUNK1 has completed. In operation S280, the storage device 100a transmits, to the host 200a, the response message indicating that the write operation on the third chunk CHUNK2 has completed. In operation S290, the storage device 100a transmits, to the host 200a, the response message indicating that the write operation on the fourth chunk CHUNK3 has completed.

Referring back to FIG. 3, the controller 110a may include a mapping index manager MIM and a mapping table MTa. The mapping index manager MIM may generate mapping indices used to store mapping information of the chunks based on the keys and the chunk indices included in the command CMD received from the host 200a. In an embodiment, the mapping index manager MIM may generate the mapping indices in such a manner that the mapping information of the chunks included in the value corresponding to the key is distributed and stored in the mapping table MTa. A detailed operation of the mapping index manager MIM will be described with reference to FIG. 9. In the mapping table MTa, a physical address used to write the chunks on the NVM 120 may be stored according to the generated mapping indices. Hereinafter, the controller 110a will be described in detail with reference to FIG. 8.

As set forth above for FIG. 7, a write operation may be performed at S250 after multiple put commands are individually and separately received at S210, S220, S230 and S240. Responses are individually and separately sent after the write command.

Figure 8:
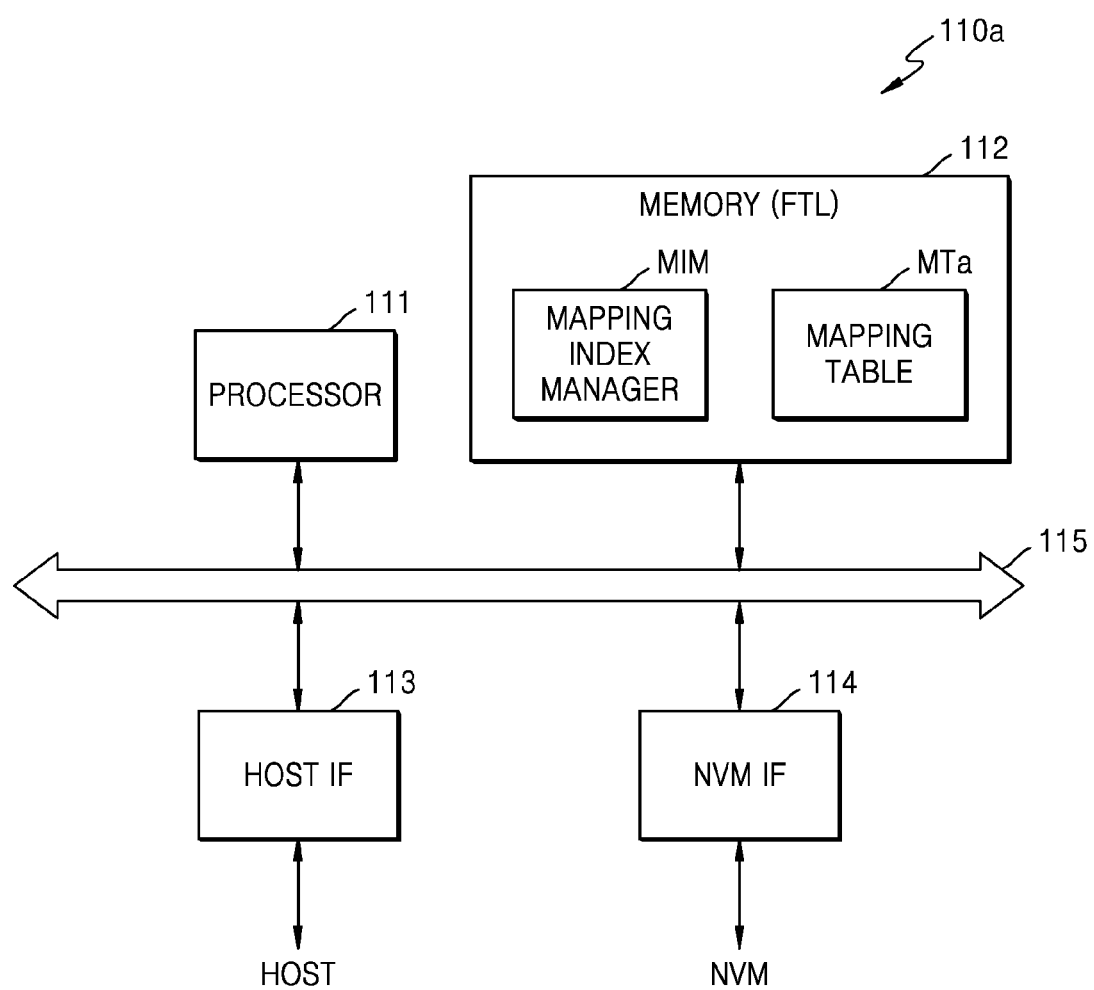
FIG. 8 illustrates a block diagram of a controller of FIG. 3 according to an embodiment.

FIG. 8 illustrates a block diagram of the controller 110a of FIG. 3, according to an embodiment.

Referring to FIG. 8, the controller 110a may include the processor 111, a memory 112, a host interface (IF) 113, and a non-volatile memory interface 114 (NVM IF), and the processor 111, the memory 112, the host IF 113, and the non-volatile memory interface 114 may communicate with each other via a bus 115. The processor 111 may include a central processing unit (CPU), a microprocessor, or the like and may control operations of the controller 110a overall. In an embodiment, the processor 111 may be embodied as a multi-core processor, for example, a quad-core processor.

The host IF 113 may provide an interface between the host 200a and the controller 110a, and for example, the host IF 113 may provide an interface according to a Universal Serial Bus (USB), an MMC, a PCI Express (PCI-E), an AT Attachment (ATA), a Serial AT Attachment (SATA), a Parallel AT Attachment (PATA), a Small Computer System Interface (SCSI), a Serial Attached SCSI (SAS), an Enhanced Small Disk Interface (ESDI), an Integrated Drive Electronics (IDE), and the like.

In an embodiment, the host IF 113 may include a command decoder. The command decoder may decode the command CMD received from the host 200a and may classify the key, the chunk, and the chunk index included in the command CMD. In an embodiment, the host IF 113 may further include a hashing module that performs a hashing operation on a key, and the hashing module may generate a hashed key from the key and may provide the generated hashed key to the mapping index manager MIM. However, one or more embodiments of the present disclosure are not limited thereto. The hashing module may be embodied in a Flash Translation Layer (FTL) and thus may be loaded to the memory 112.

The memory 112 may be driven under the control of the processor 111 and may be used as an operation memory, a buffer memory, a cache memory, or the like. For example, the memory 112 may be embodied as a volatile memory such as DRAM or SRAM or a non-volatile memory such as PRAM or flash memory. In an embodiment, the mapping index manager MIM and the mapping table MTa may be loaded to the memory 112. The mapping index manager MIM may be embodied as firmware or software and may be loaded to the memory 112. In an embodiment, the mapping index manager MIM may be embodied in the FTL. However, one or more embodiments of the present disclosure are not limited thereto. The mapping index manager MIM may be embodied as hardware. The mapping table MTa may store, for example, a K2P mapping table, and may be loaded to the memory 112.

The non-volatile memory interface 114 may provide an interface between the controller 110a and the NVM 120. For example, the mapping table MTa, write data, and read data may be received/transmitted between the controller 110a and the NVM 120 through the non-volatile memory interface 114. In an embodiment, the non-volatile memory interface 114 may be provided in numbers that correspond to the number of non-volatile memory chips included in the storage device 100a or the number of channels between the controller 110a and the NVM 120.

Figure 9:
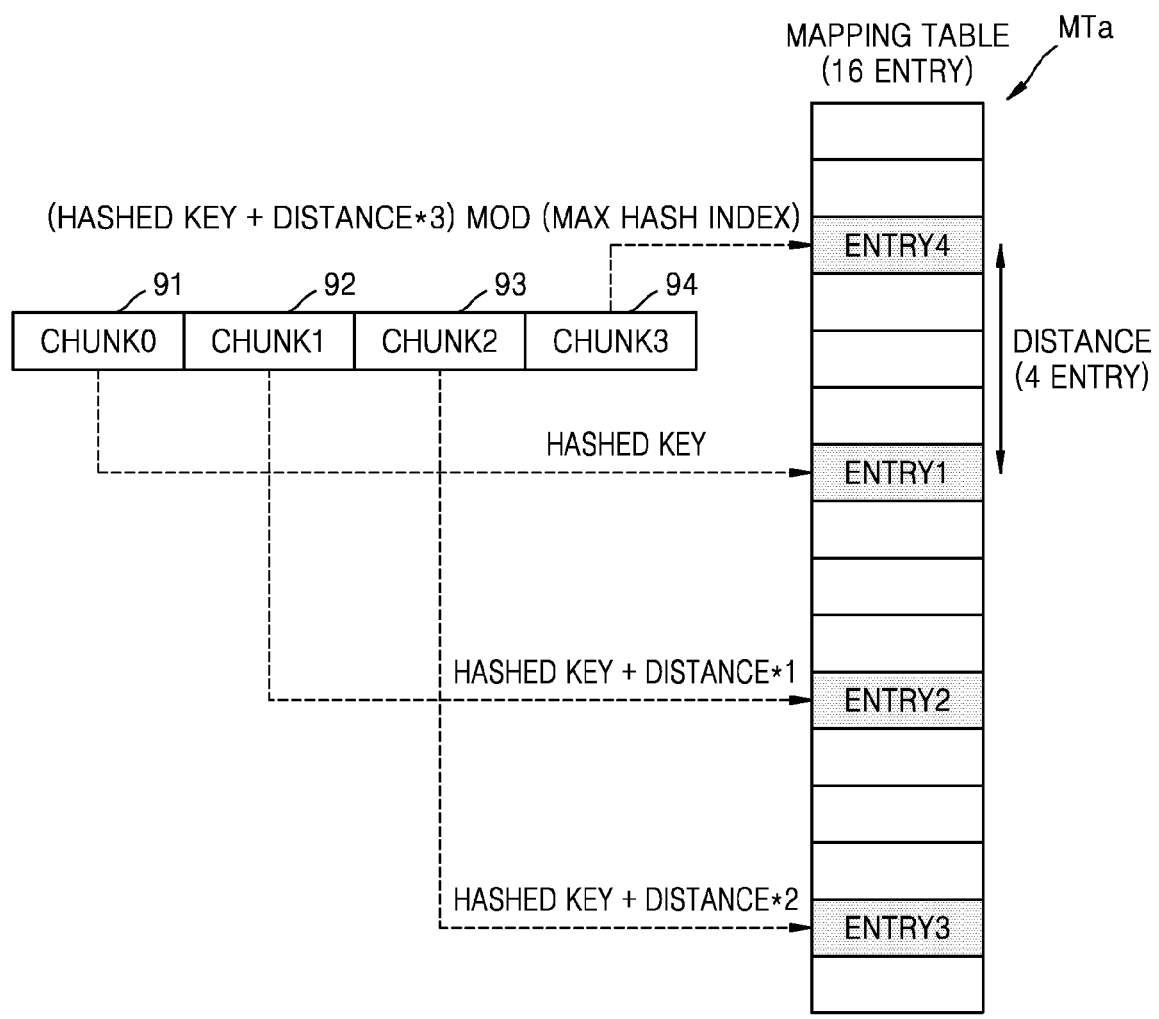
FIG. 9 illustrates a relationship between a mapping table and chunks, according to an embodiment.

FIG. 9 illustrates a relationship between the mapping table MTa and the first chunk CHUNK0 to fourth chunk CHUNK3, according to an embodiment.

Referring to FIGS. 3 to 5 and 9, the controller 110a may sequentially receive, from the host 200a, first command 91 to fourth command 94 respectively including the first chunk CHUNK0 to fourth chunk CHUNK3. For example, the first chunk CHUNK0 to fourth chunk CHUNK3 may be included in the first value V1 of FIG. 4. In this case, the first command 91 may include the first key KEY1, the first chunk CHUNK0, and the first chunk index CI0. The second command 92 may include the first key KEY1, the second chunk CHUNK1, and the second chunk index CI1. The third command 93 may include the first key KEY1, the third chunk CHUNK2, and the third chunk index CI2. The fourth command 94 may include the first key KEY1, the fourth chunk CHUNK3, and the fourth chunk index CI3.

Since the first command 91 to fourth command 94 include the same first key KEY1, when a hashed key generated by performing a hashing operation on the first key KEY1 is used as a mapping index, mapping information corresponding to the first chunk CHUNK0 to fourth chunk CHUNK3 may be stored in continuous mapping entries in the mapping table MTa. Therefore, an over collision is likely to occur, and the performance of the storage device 100a and use efficiency of the mapping table MTa may decrease.

In an embodiment, the mapping index manager MIM may generate a hash index HI by using Equation 1 below and may use the generated hash index HI as a mapping index. Accordingly, the mapping table may be referred to as a hash table. In the present specification, the mapping table may be substantially the same as the hash table, unless otherwise defined.

$$HI=(HK+D*CI) \bmod MHI \qquad \text{[Equation 1]}$$

where HK denotes a hashed key, D is a distance between adjacent hash entries (mapping entries) respectively corresponding to two adjacent chunks included in a value, in other words, an offset, and MHI may be a maximum hash index of the hash index HI (i.e. a maximum value of the hash index HI which is also referred to as the mapping index). As described below, the distance D may also be the distance between two adjacent mapping indices (hash indices). The mapping index manager MIM separates the adjacent hash entries respectively corresponding to the adjacent chunks from each other by the distance D and thus may distribute and store, in the mapping table MTa, pieces of mapping data respectively corresponding to the first chunk CHUNK0 to fourth chunk CHUNK3. Accordingly, the pieces of the mapping data respectively corresponding to the first chunk CHUNK0 to fourth chunk CHUNK3 may be evenly distributed in the mapping table MTa, and the possibility of hash collisions occurring may decrease. Also, the mapping index manager MIM may calculate the distance D by using Equation 2 below.

$$D=MHI/MCC \qquad \text{[Equation 2]}$$

where MHI may be a maximum hash index of the hash index (i.e. a maximum value of the hash index HI which is also referred to as the mapping index) and may vary depending on a size of the mapping table MTa. Also, MCC may be a maximum chunk count of the number of chunks and may vary depending on a size of the value. For example, the maximum hash index of the hash index may be 16 in the mapping table MTa, and the maximum chunk count of the number of chunks may be 4 in the first value V1. Therefore, the distance D may be 4. Hereinafter, an operation of generating the mapping indices respectively corresponding to the first chunk CHUNK0 to fourth chunk CHUNK3 will be described in more detail with reference to FIG. 10.

Figure 10:
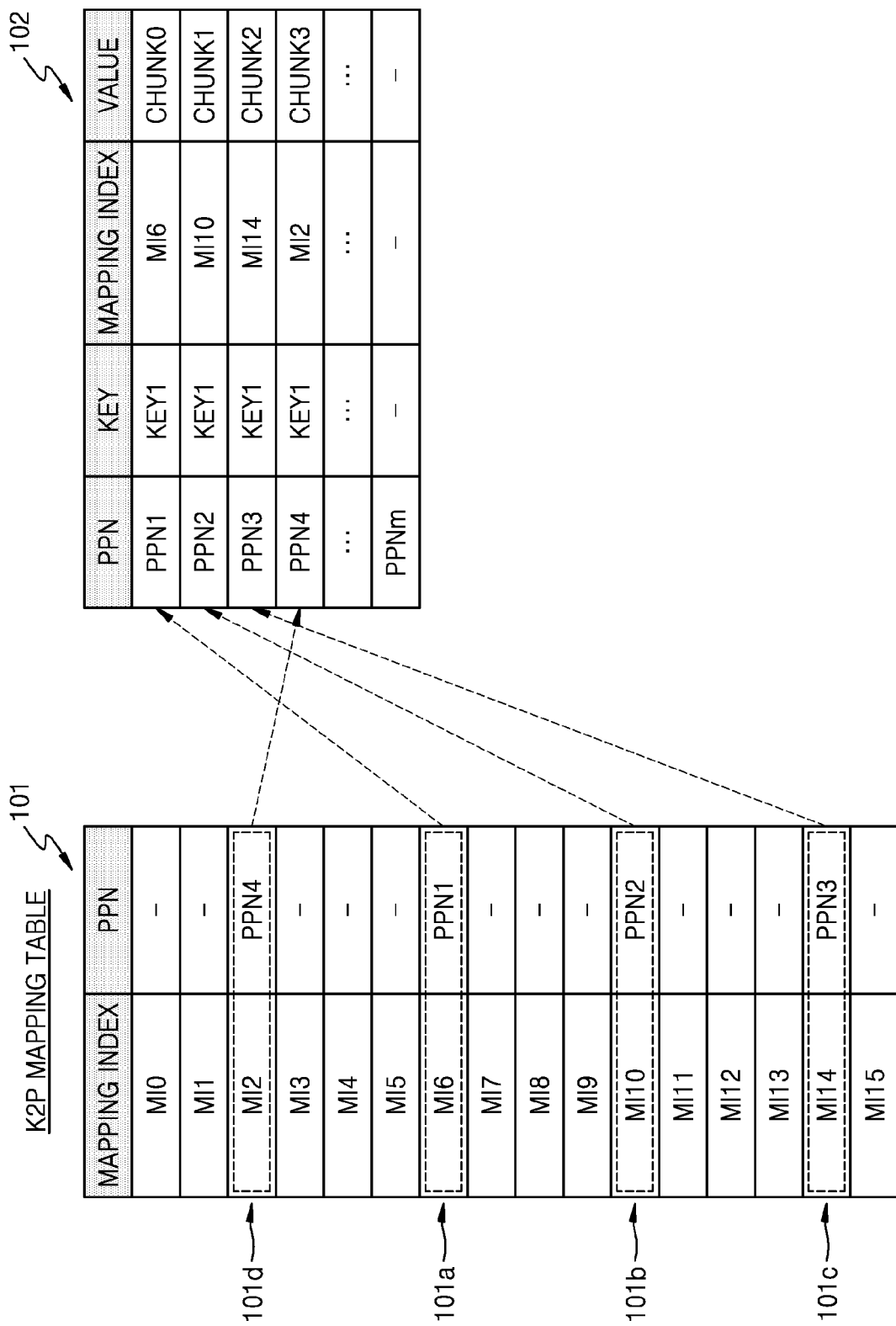
FIG. 10 illustrates a mapping table and a non-volatile memory, according to an embodiment.

FIG. 10 illustrates a mapping table 101 and a NVM 102, according to an embodiment.

Referring to FIGS. 8 to 10, the mapping index manager MIM may generate a first mapping index based on the first key KEY1 and the first chunk index CI0 included in the first command 91. The first mapping index may be determined as the hashed key HK generated from the first key KEY1, and for example, the mapping index may be determined to be MI6. A physical address of the first chunk CHUNK0 may be stored in a first mapping entry 101a of the mapping table 101. Accordingly, the first key KEY1, the first mapping index MI6, and the first chunk CHUNK0 may be written in the PPN1 of the NVM 102.

Then, the mapping index manager MIM may generate a second mapping index based on the first key KEY1 and the second chunk index CI1 included in the second command 92. The second mapping index may be determined as MI10 that is separated from the first mapping index MI6 by the distance D, and a physical address of the second chunk CHUNK1 may be stored as a PPN2 in a second mapping entry 101b of the mapping table 101. Accordingly, the first key KEY1, the second mapping index MI10, and the second chunk CHUNK1 may be written in the PPN2 of the NVM 102. As noted, the distance D is calculated in equation 2 based on a maximum value of a mapping index of the mapping table (maximum value of a hash index of the hash table) and a maximum chunk count of the chunks. As a reminder, the distance D may correspond to the distance between adjacent hash entries (mapping entries) as well as between adjacent mapping indices.

The mapping index manager MIM may generate a third mapping index based on the first key KEY1 and the third chunk index CI2 included in the third command 93. The third mapping index may be determined as MI14 that is separated from the second mapping index MI10 by the distance D, and a physical address of the third chunk CHUNK2 may be stored as a PPN3 in a third mapping entry 101c of the mapping table 101. Accordingly, the first key KEY1, the third mapping index MI14, and the third chunk CHUNK2 may be written in the PPN3 of the NVM 102.

The mapping index manager MIM may generate a fourth mapping index based on the first key KEY1 and the fourth chunk index CI3 included in the fourth command 94. The fourth mapping index may be determined as MI2 that is separated from the third mapping index MI14 by the distance D by performing an MOD operation, and a physical address of the fourth chunk CHUNK3 may be stored as a PPN4 in a fourth mapping entry 101d of the mapping table 101. Accordingly, the first key KEY1, the fourth mapping index MI2, and the fourth chunk CHUNK3 may be written in the PPN4 of the NVM 102.

As described above, according to the present embodiment, the storage device 100a may include the mapping index manager MIM. The mapping index manager MIM may distribute and store pieces of mapping data corresponding to different chunks and reduce the occurrence of hashing collisions, thereby reducing the use of additional memory sources. In the embodiment of FIG. 10, a different mapping index is generated for each different chunk index. In addition, the storage device 100a may embody the mapping table 101 in a direct mapping manner and thus may have the same search latency regardless of chunk indices. Also, according to the present embodiment, large values having the same key may be utilized along with multiple values each having multiple keys.

Figure 11:
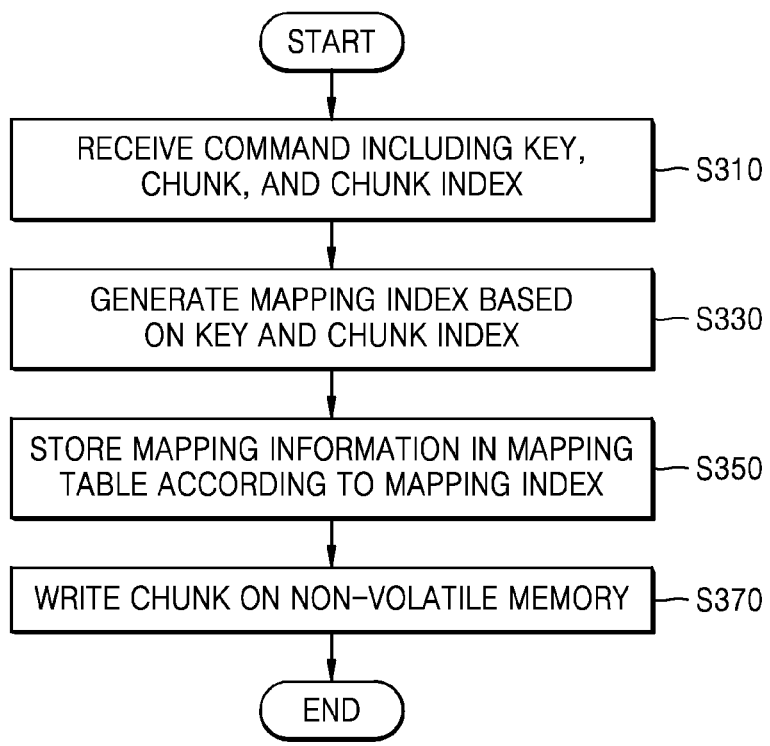
FIG. 11 illustrates a flowchart of a method of operating a key-value storage device, according to an embodiment.

FIG. 11 illustrates a flowchart of a method of operating a key-value storage device, according to an embodiment.

Referring to FIG. 11, the method of operating the key-value storage device according to the present embodiment may correspond to a writing method performed in response to a write request from a host. For example, the method of operating the key-value storage device according to the present embodiment may include operations that are time-serially performed in the storage device 100a of FIG. 3 that stores key-values. Therefore, the descriptions provided with reference to FIGS. 3 to 10 may be applied to the present embodiment, and repeated descriptions will be omitted herein.

In operation S310, the controller 110a included in the storage device 100a may receive, from the host 200a, a command including a key, a chunk included in a value corresponding to the key, and a chunk index corresponding to the chunk. However, one or more embodiments of the present disclosure are not limited thereto. In some embodiments, the controller 110a may receive, from the host 200a, a command including information regarding a start offset of a chunk in a large value and a size of the chunk.

In operation S330, the controller 110a generates a mapping index based on the key and the chunk index. For example, the mapping index may correspond to a hash index calculated via Equations 1 and 2 shown above. In operation S350, the controller 110a stores, in the mapping table MT,
the mapping information according to the mapping index. In operation S370, the chunk is written on the NVM 120 based on the mapping information stored in the mapping table MT. In an embodiment, the key and the hashed key may be further written on the NVM 120.

Figure 12:
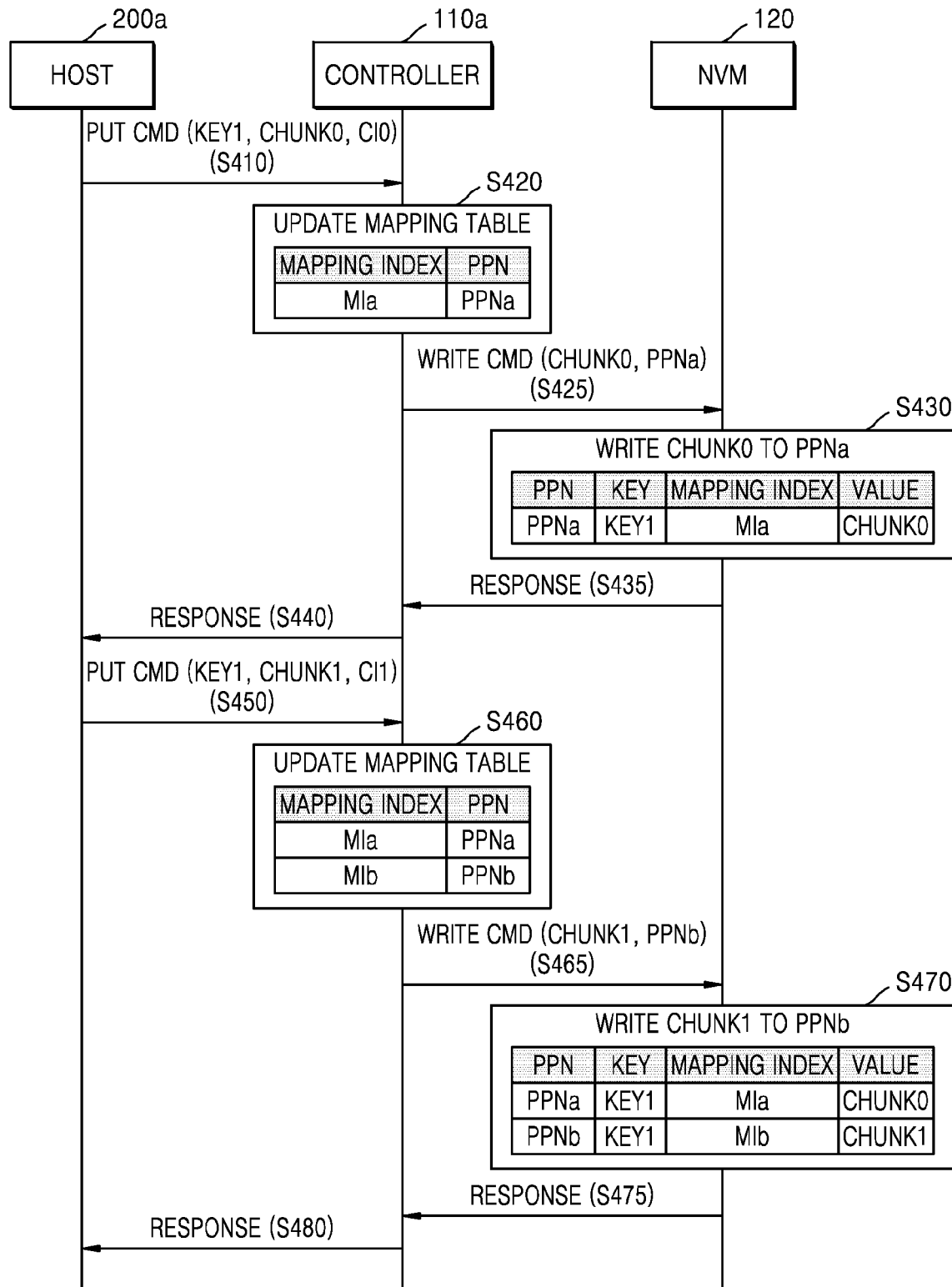
FIG. 12 illustrates a flowchart of a write operation among a host, a controller, and a non-volatile memory, according to an embodiment.

FIG. 12 illustrates a flowchart of a write operation among the host 200a, the controller 110a, and the NVM 120, according to an embodiment. The write operation according to the present embodiment may correspond to the example of FIG. 11, and hereinafter, the write operation will be described with reference to FIGS. 3 and 12.

In operation S410, the host 200a transmits, to the controller 110a, a put command PUT CMD including the first key KEY1, the first chunk CHUNK0 included in the value corresponding to the first key KEY1, and the first chunk index CI0 corresponding to the first chunk CHUNK0. In operation S420, the controller 110a generates a first mapping index MIa based on the first key KEY1 and the first chunk index CI0 and updates, on a mapping table, a first PPN PPNa for writing the first chunk CHUNK0. In operation S425, the controller 110a may transmit, to the NVM 120, a write command WRITE CMD including the first chunk CHUNK0 and the first PPN PPNa. In operation S430, the NVM 120 may write the first chunk CHUNK0 on the first PPN PPNa. In this case, the first key KEY1 and the first mapping index MIa may be further written on the first PPN PPNa. In operation S435, the NVM 120 transmits, to the controller 110a, a response message indicating that the write operation has completed. In operation S440, the controller 110a transmits, to the host 200a, a response message indicating that the write operation of writing the first chunk CHUNK0 has completed.

In operation S450, the host 200a transmits, to the controller 110a, a put command PUT CMD including the first key KEY1, the second chunk CHUNK1 included in the value corresponding to the first key KEY1, and the second chunk index CI1 corresponding to the second chunk CHUNK1. In operation S460, the controller 110a may generate a second mapping index MIb based on the first key KEY1 and the second chunk index CI1 and may update, on the mapping table, a second PPN PPNb for writing the second chunk CHUNK1. In operation S465, the controller 110a transmits, to the NVM 120, a write command WRITE CMD including the second chunk CHUNK1 and the second PPN PPNb. In operation S470, the NVM 120 writes the second chunk CHUNK1 on the second PPN PPNb. In this case, the first key KEY1 and the second mapping index MIb may be further written on the second PPN PPNb. In operation S475, the NVM 120 transmits, to the controller 110a, a response message indicating that the write operation has completed. In operation S480, the controller 110a transmits, to the host 200a, a response message indicating that the write operation of writing the second chunk CHUNK1 has completed. Although not illustrated, operations substantially the same as operations S410 to S480 may be further performed according to the number of chunks included in the value.

Figure 13:
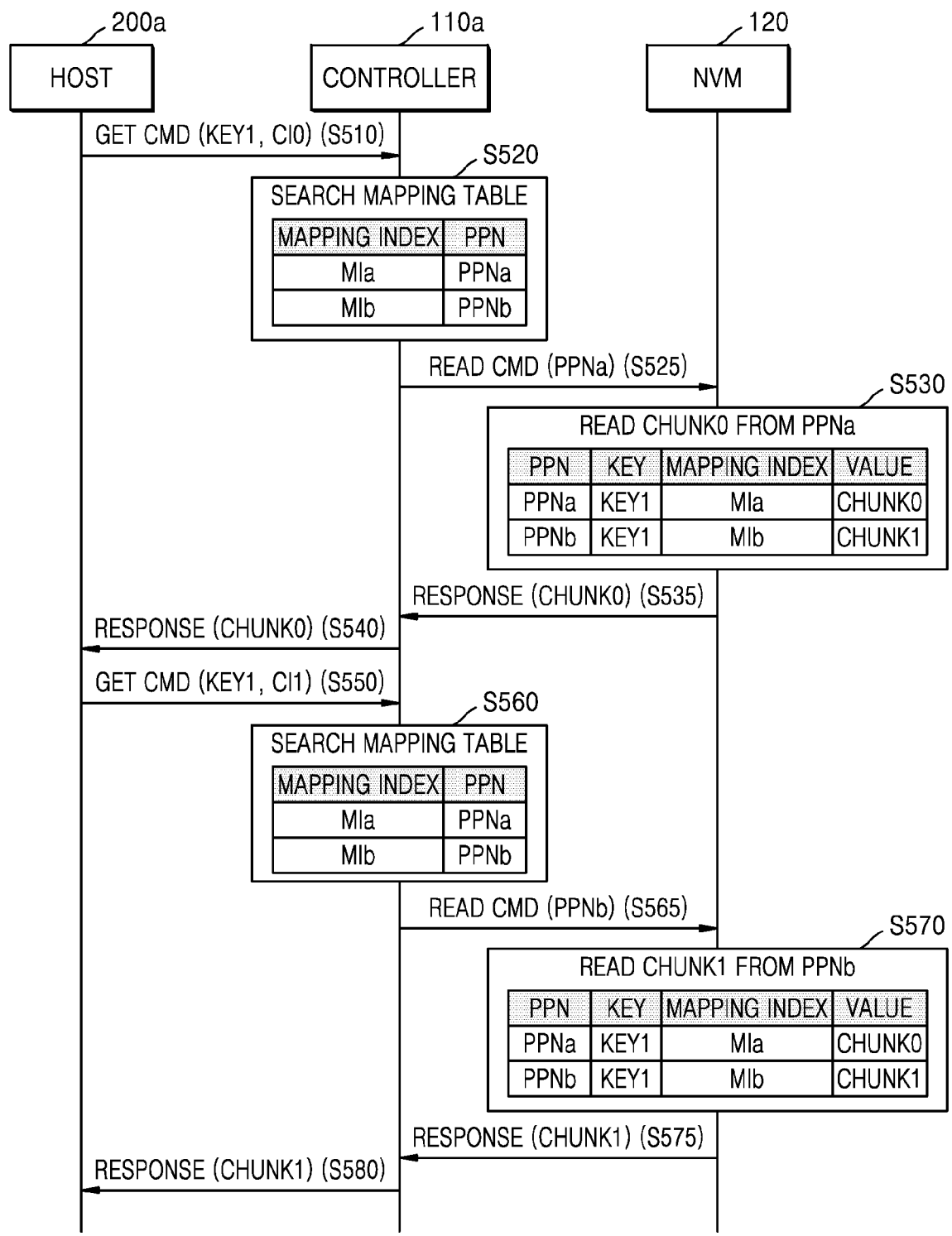
FIG. 13 illustrates a flowchart of a read operation among a host, a controller, and a non-volatile memory, according to an embodiment.

FIG. 13 illustrates a flowchart of a read operation among the host 200a, the controller 110a, and the NVM 120, according to an embodiment. Hereinafter, the read operation will be described with reference to FIGS. 3 and 13.

In operation S510, the host 200a transmits, to the controller 110a, a get command GET CMD including the first key KEY1 and the first chunk index CI0. In operation S520, the controller 110a retrieves a mapping table and finds the first PPN PPNa that is a physical address in which the first chunk CHUNK0 corresponding to the first chunk index CI0 is stored. In detail, the controller 110a may generate a hashed key from the first key KEY1 and may determine the mapping index as MIa based on the generated hashed key and the first chunk index CI0. Then, the first PPN PPNa, which is stored in a mapping entry corresponding to the mapping index MIa determined by the controller 110a, may be found. In operation S525, the controller 110a transmits, to the NVM 120, a read command READ CMD including the first PPN PPNa. In operation S530, the NVM 120 reads the first chunk CHUNK0 stored in the first PPN PPNa. In operation S535, the NVM 120 transmits, to the controller 110a, a response message including the read first chunk CHUNK0. In operation S540, the controller 110a transmits, to the host 200a, the response message including the read first chunk CHUNK0.

In operation S550, the host 200a transmits, to the controller 110a, a get command GET CMD including the first key KEY1 and the second chunk index CI1. In operation S560, the controller 110a retrieves a mapping table and finds the second PPN PPNb that is a physical address in which the second chunk CHUNK1 corresponding to the second chunk index CI1 is stored. In detail, the controller 110a may generate the hashed key from the first key KEY1 and may determine the mapping index as MIb based on the generated hashed key and the second chunk index CI1. Then, the second PPN PPNb, which is stored in a mapping entry corresponding to the mapping index MIb determined by the controller 110a, may be found. In operation S565, the controller 110a transmits, to the NVM 120, a read command READ CMD including the second PPN PPNb. In operation S570, the NVM 120 reads the second chunk CHUNK1 stored in the second PPN PPNb. In operation S575, the NVM 120 transmits, to the controller 110a, a response message including the read second chunk CHUNK1. In operation S580, the controller 110a transmits, to the host 200a, the response message including the read second chunk CHUNK1. Although not illustrated, operations substantially the same as operations S510 to S580 may be further performed according to the number of chunks included in the value.

Figure 14:
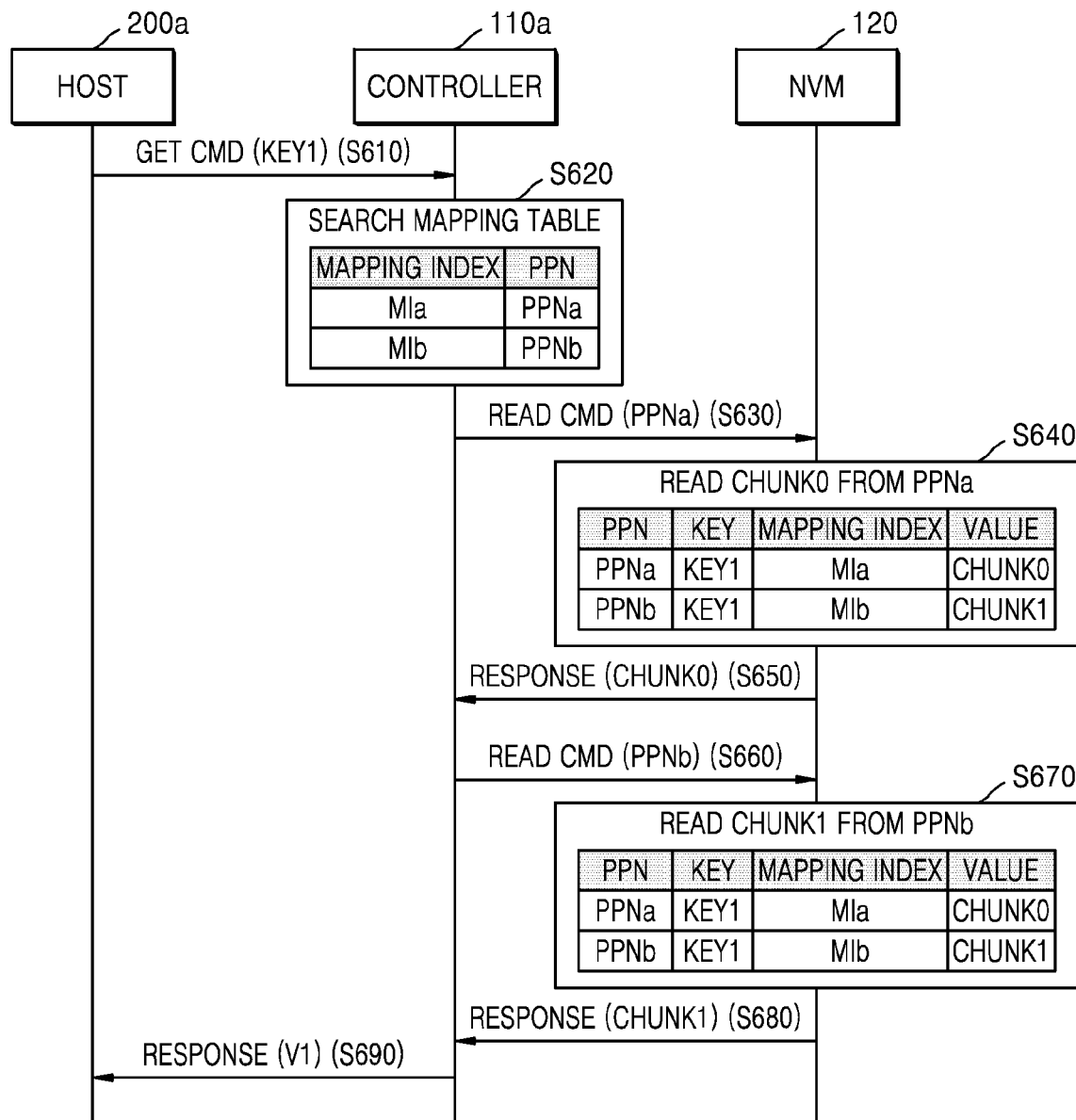
FIG. 14 illustrates a flowchart of another read operation among a host, a controller, and a non-volatile memory, according to an embodiment.

FIG. 14 illustrates a flowchart of another example of a read operation among the host 200a, the controller 110a, and the NVM 120, according to an embodiment. Hereinafter, the read operation will be described with reference to FIGS. 3 and 14.

In operation S610, the host 200a transmits, to the controller 110a, a get command GET CMD including the first key KEY1. In operation S620, the controller 110a may retrieve a mapping table and may find the physical addresses of the first and second chunks CHUNK0 and CHUNK1 included in the first value V1 corresponding to the first key KEY1. For example, the controller 110a may find the first PPN PPNa that is the physical address of the first chunk CHUNK0 and then the second PPN PPNb that is the physical address of the second chunk CHUNK1.

In operation S630, the controller 110a transmits, to the NVM 120, a read command READ CMD including the first PPN PPNa. In operation S640, the NVM 120 reads the first chunk CHUNK0 from the first PPN PPNa. In operation S650, the NVM 120 transmits the read first chunk CHUNK0 to the controller 110a. In operation S660, the controller 110a transmits a read command READ CMD including the second PPN PPNb to the NVM 120. In operation S670, the NVM 120 reads the second chunk CHUNK1 from the second PPN PPNb. In operation S680, the NVM 120 transmits the read second chunk CHUNK1 to the controller 110a.

In operation S690, the controller 110a transmits, to the host 200a, the first value V1 including the first and second chunks CHUNK0 and CHUNK1.

Figure 15:
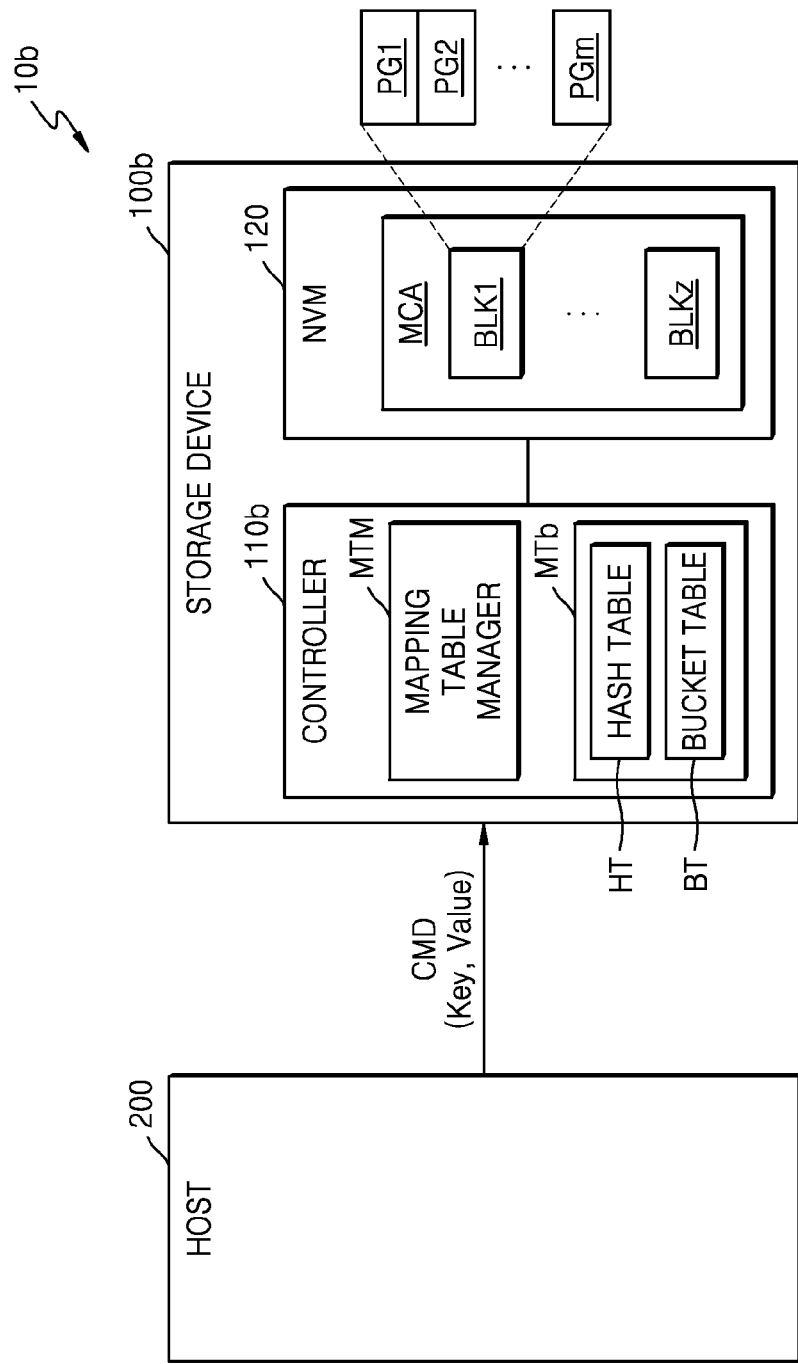
FIG. 15 illustrates a block diagram of another example of a storage system according to an embodiment.

FIG. 15 illustrates a block diagram of another example of a storage system 10b according to an embodiment. The storage system 10b according to the present embodiment may be an example of the storage system 10 of FIG. 1. The descriptions provided with reference to FIGS. 1 to 2B may be applied to the present embodiment, and repeated descriptions will be omitted herein.

Referring to FIG. 15, a storage device 100b may include a mapping table manager MTM and a mapping table MTb, and the mapping table MTb may include a hash table HT and a bucket table BT. The hash table HT may include hash entries, and mapping information corresponding to a hash index may be stored in each hash entry. In this case, the hash index may correspond to a hashed key generated from a key. As a result of performing a hashing operation on different keys, "hashing collisions" over the collision limit may occur. That is, hashing collisions which result in generation of the same hashed key may occur, and the collision limit may be a predetermined threshold of how many times the occurrence is to be tolerated. The storage device 100b may determine the collision limit on the hash table HT in advance to achieve constant read latency. When the number of keys having the same hash index exceeds the collision limit, it is considered that "over collisions" occur. In other words, the collision limit may be a threshold number that is determined in advance, and steps may be taken when the collision limit is met.

The hash table HT may include hash entries, and mapping data corresponding to the hash index may be stored in each hash entry. The bucket table BT may include bucket entries. Mapping data may correspond to a hash index for which an over collision occurs, and the mapping data may be stored in each bucket entry. In an embodiment, the mapping table MTb may be loaded to a memory such as DRAM or SRAM, and a size of a first area assigned to the hash table HT may be greater than a size of a second area assigned to the bucket table BT in the memory.

Figure 16:
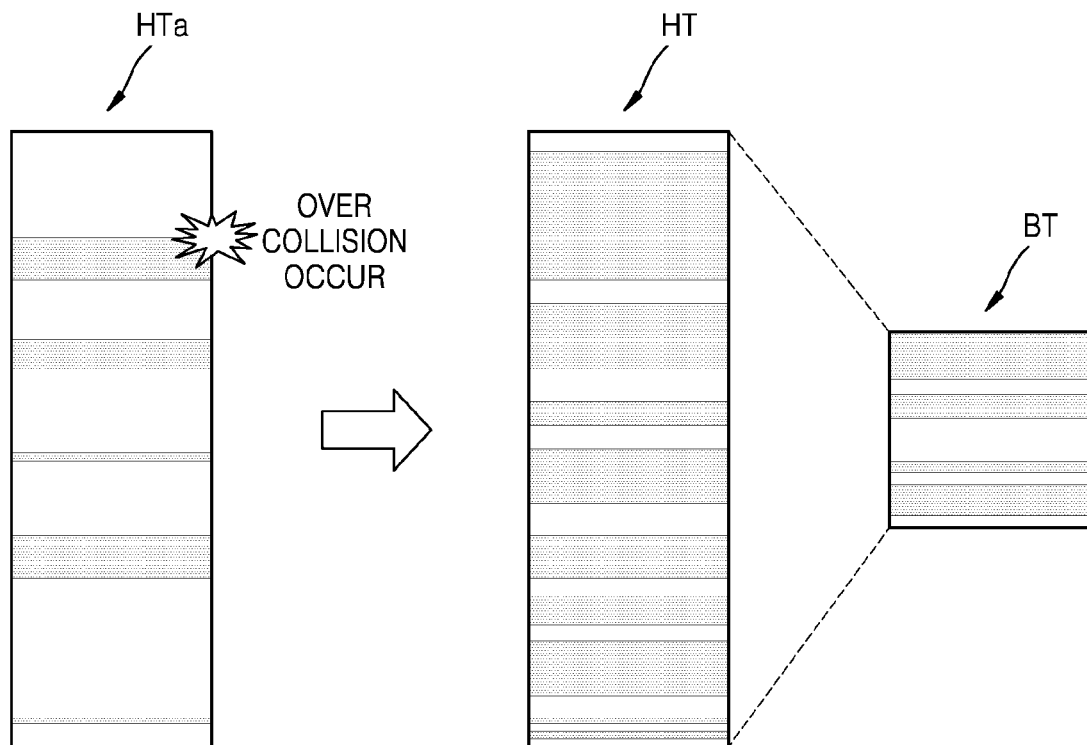
FIG. 16 illustrates a hash table and a bucket table, according to an embodiment.

FIG. 16 illustrates the hash table HT and the bucket table BT, according to an embodiment.

Referring to FIG. 16, when an over collision occurs in a general hash table HTa, the mapping information may be no longer stored in the hash table HTa, and thus a data structure that is not the hash table HTa is required. For example, when an over collision occurs, hash entries stored in the hash table HTa may be re-arranged in a new hash table having a greater size than the hash table HTa. In this case, however, it may be difficult to increase a size of the hash table due to limited capacity of the memory, and a great amount of resources may be used to re-arrange the hash entries which have been already stored.

According to the present embodiment, the bucket table BT may include buckets, and each bucket may include at least one bucket entry. When an over collision occurs in the hash table HT for a hash index, an entry corresponding to the hash index may be stored in the bucket entries included in the bucket table BT. Accordingly, the use efficiency of the hash table HT may be improved by using the hash table HT without any change, and an amount of resources used to re-arrange the hash entries may decrease. Since the bucket table BT may perform a supportive role for the hash table HT by using a less amount of memory resources compared to the hash table HT, the bucket table BT may be referred to as a secondary bucket hash.

Figure 17:
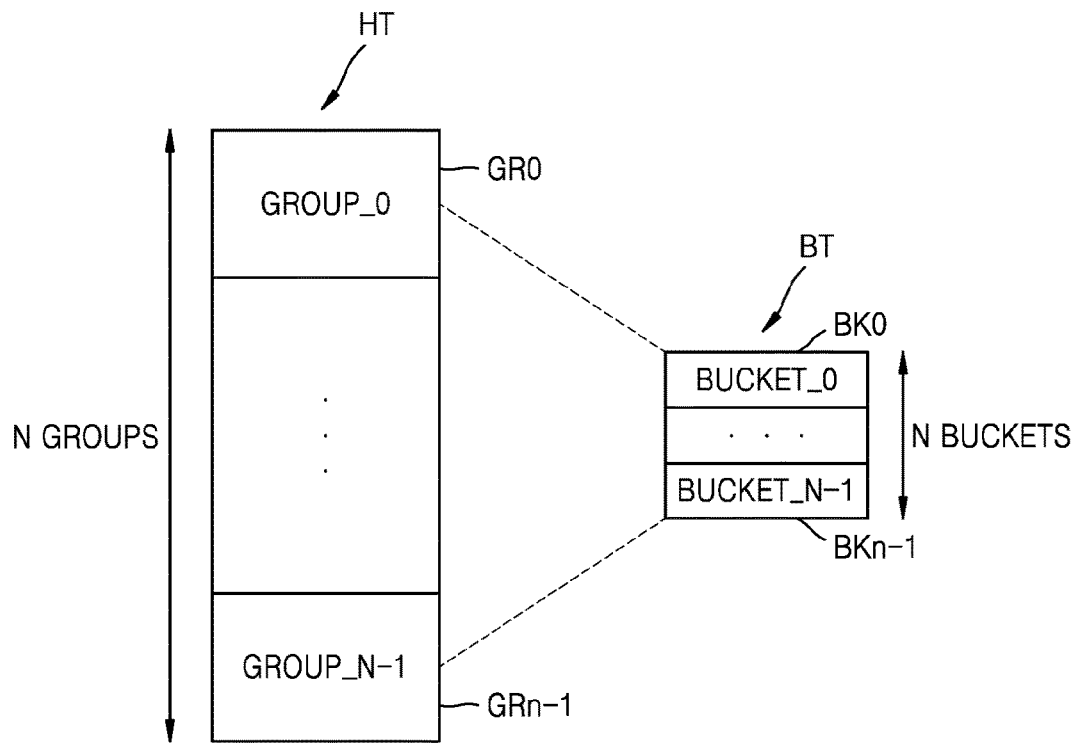
FIG. 17 illustrates relationships between groups, which are included a hash in table, and buckets included in a bucket table, according to an embodiment.

FIG. 17 illustrates relationships between groups GR0 to GRn−1, which are included in the hash table HT, and buckets BK0 to BKn−1 included in the bucket table BT, according to an embodiment.

Referring to FIG. 17, the hash table HT may include N groups, that is, the groups GR0 to GRn−1, and the bucket table BT may include N buckets, that is, the buckets BK0 to BKn−1, which respectively correspond to the groups GR0 to GRn−1. Here, N may be a natural number equal to or greater than 2, and the number of groups included in the hash table HT may be the same as the number of buckets included in the bucket table BT. A size of the hash table HT may be greater than that of the bucket table BT. Accordingly, a size of each of the groups GR0 to GRn−1 may be greater than a size of each of the buckets BK0 to BKn−1.

According to the present embodiment, since each group and each bucket have a one-to-one relationship, when the over collision occurs for a hash index and the entry corresponding to the hash index is retrieved, a bucket matching with a corresponding group is retrieved. As a result, search overhead may be reduced. However, one or more embodiments of the present disclosure are not limited thereto. In some embodiments, multiple groups may correspond to one bucket. The relationships between the groups included in the hash table HT and the buckets included in the bucket table BT may be adaptively determined according to memory resources.

Figure 18A:
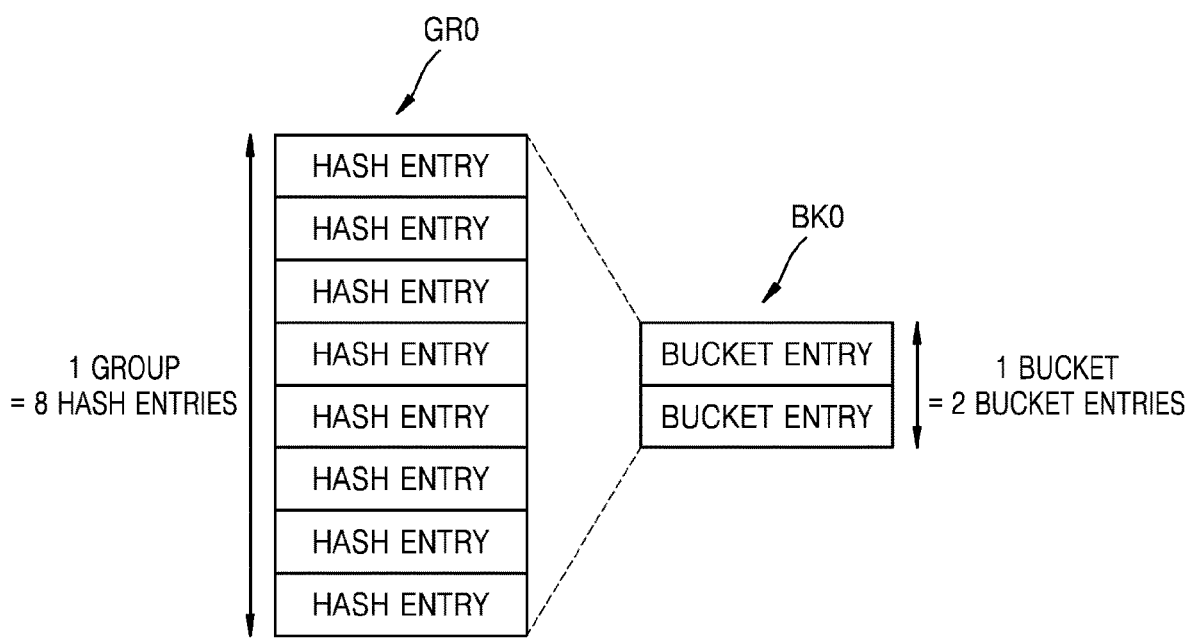
FIG. 18A illustrates a first group and a first bucket, according to an embodiment.

FIG. 18A illustrates a first group GR0 and a first bucket BK0, according to an embodiment. FIG. 18B illustrates a hash entry according to an embodiment. FIG. 18C illustrates a bucket entry according to an embodiment. Hereinafter, the examples of FIGS. 18A to 18C will be described with reference to FIGS. 13 to 18C.

A size of the first group GR0 of the hash table HT may be determined to be 2 raised to the $K^{th}$ power ("$2^K$"), and K may be an arbitrary natural number. For example, K may be 3, and accordingly, the first group GR0 may include eight hash entries. In the first group GR0, values of the hash index may be 0000, 0001, 0010, 0011, 0100, 0101, 0110, and 0111. In this case, by removing lower three bits from each value of the hash index, a value of a corresponding bucket index may be obtained. For example, a value of a bucket index corresponding to the first group GR0 may be 0, and thus, it is found that the first group GR0 corresponds to the first bucket BK0.

The hash entry may be generated for each hash index HI. In an embodiment, the hash entry may include a physical address (that is, a PPN), a bitmap, and a hashtag. However, one or more embodiments of the present disclosure are not limited thereto. The hash entry may only include the physical address or may include at least one of the physical address, the bitmap, and the hashtag. The physical address may be a PPN used to store a value corresponding to the hash index HI in a NVM. The bitmap may indicate a storage location of at least one hash entry corresponding to the hash index HI. For example, when a collision limit is determined to be 4, the bitmap may be embodied as 4-bits. For example, a location where the hash entry corresponding to the hash index HI is stored may be set to be '1', and a location where the hash entry corresponding to the hash index HI is not stored may be set to be '0'. The hashtag may indicate whether to use the buckets included in the bucket table BT. For example, when mapping information corresponding to the hash index HI is stored in the buckets, the hashtag may be set to be '1'.

The first bucket BK0 of the bucket table BT may include, for example, two bucket entries. The number of bucket entries included in the first bucket BK0 may be determined based on an average value of hash entries in which over collisions occur in N groups included in the hash table HT. Therefore, when the average value of the hash entries in which the over collisions occur is increased, the number of bucket entries included in the first bucket BK0 may increase.

The bucket entries may be generated for each bucket index BI. In an embodiment, the bucket entry may include a physical address (that is, a PPN), a bitmap, and a bucket tag. However, one or more embodiments of the present disclosure are not limited thereto. The bucket entry may only include the physical address or may include at least one of the physical address, the bitmap, and the bucket tag. The physical address may be a PPN used to store a value corresponding to the hash index HI, regarding which the over collision occurs, in a NVM. The bitmap may indicate a storage location of at least one bucket entry corresponding to the bucket index BI. For example, a location where the bucket entry corresponding to the bucket index BI is stored may be set to be '1', and a location where the bucket entry corresponding to the bucket index BI is not stored may be set to be '0'. The bucket tag may indicate whether to use a bucket entry included in another bucket adjacent thereto. For example, when mapping information corresponding to the bucket index BI is stored in the other bucket adjacent to the bucket, the bucket tag may be set to be '1'.

Figure 19A:
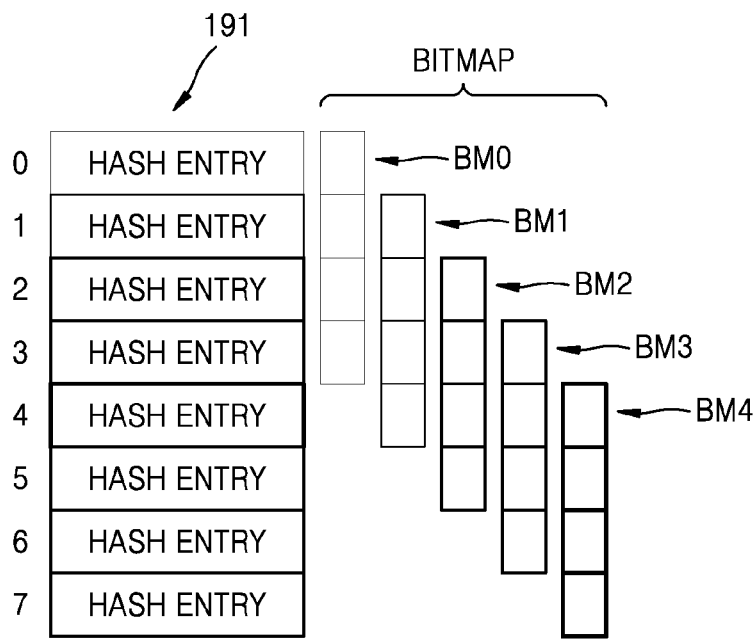
FIGS. 19A and 19B respectively illustrate examples of groups according to an embodiment.
Figure 19B:
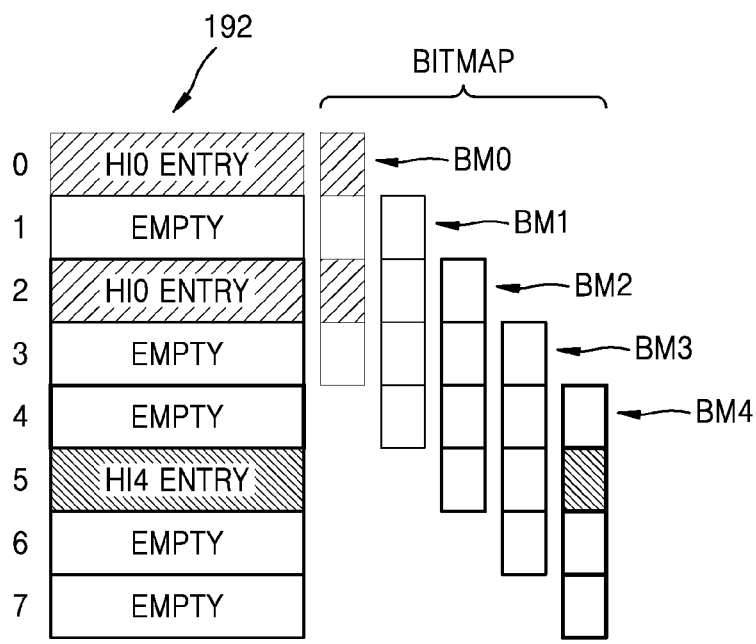

FIGS. 19A and 19B respectively illustrate examples of groups included in hash tables 191 and 192, according to an embodiment.

Referring to FIG. 19A, the hash table 191 may include eight hash entries. For example, a collision limit may be determined to be 4, and accordingly, a bitmap included in each hash entry may be embodied as 4-bits. A first bitmap BM0 may indicate a storage location of a hash entry corresponding to a hash index '0'. Likewise, a second bitmap BM1 may indicate a storage location of a hash entry corresponding to a hash index '1'.

Referring to FIG. 19B, the hash table 192 may include eight hash entries. For example, the hash index '0' may be generated from first and second keys which are different from each other. Mapping information of a first value corresponding to the first key may be stored in the hash entry corresponding to the hash index '0'. In contrast, since other mapping information has been already stored in the hash entry corresponding to the hash index '0', mapping information of a second value corresponding to the second key may be stored in another hash entry, e.g., a hash entry corresponding to a hash index '2'. Accordingly, the first bitmap BM0 corresponding to the hash index '0' may be expressed as, for example, 1010. Also, for example, a hash index '4' may be generated from a third key. Mapping information of a third value corresponding to the third key may be stored in, for example, a hash entry corresponding to a hash index '5'. Accordingly, a bitmap BM4 corresponding to the hash index '4' may be expressed as, for example, 0100.

Figure 20:
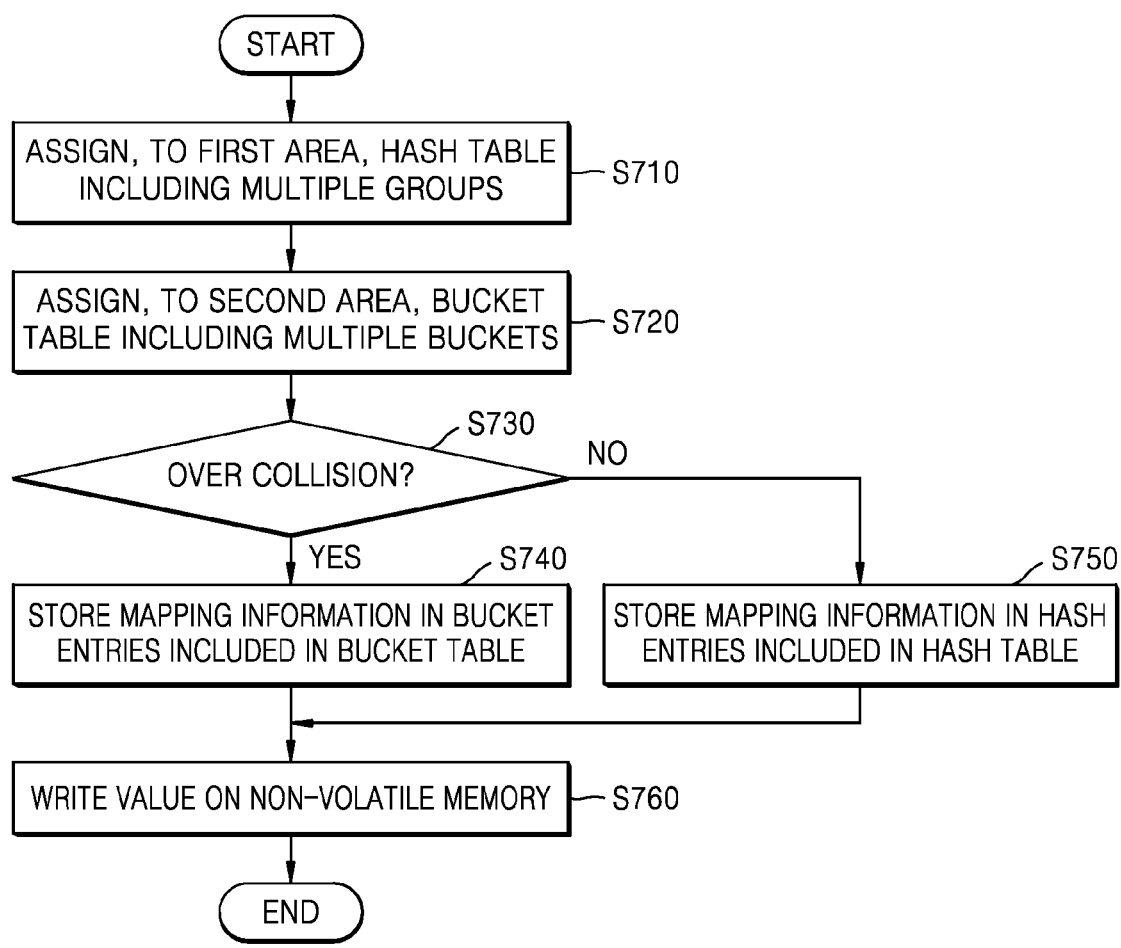
FIG. 20 is a flowchart of a method of operating a key-value storage device, according to an embodiment.

FIG. 20 is a flowchart of a method of operating a key-value storage device according to an embodiment.

Referring to FIG. 20, the method of operating the key-value storage device according to the present embodiment may correspond to a method of storing hash entries in a hash table or a bucket table, depending on whether an over collision occurs. For example, the method of operating the key-value storage device according to the present embodiment may include operations that are time-serially performed in the storage device 100b of FIG. 15 that stores key-values. Therefore, the descriptions that are provided with reference to FIGS. 15 to 19 may be applied to the present embodiment, and repeated descriptions will be omitted herein.

In operation S710, a hash table including groups may be assigned to a first area of a memory. In operation S720, a bucket table including buckets may be assigned to a second area of a memory. In this case, a size of the first area may be greater than a size of the second area. In an embodiment, the first and second areas may be embodied in the same memory chip. However, one or more embodiments of the present disclosure are not limited thereto. In some embodiments, the first and second areas may be embodied in different memory chips.

In operation S730, a determination as to whether an over collision occurs is made. As a result of determination, when an over collision for a hash index occurs, operation S740 is performed, and when an over collision for a hash index does not occur, operation S750 is performed. In operation S740, mapping information, corresponding to the hash index for which the over collision occurs, is stored in a bucket entry included in the bucket table. In operation S750, mapping information corresponding to a hash index is stored in a hash entry included in the hash table. In operation S760, a value is written on a NVM.

Figure 21:
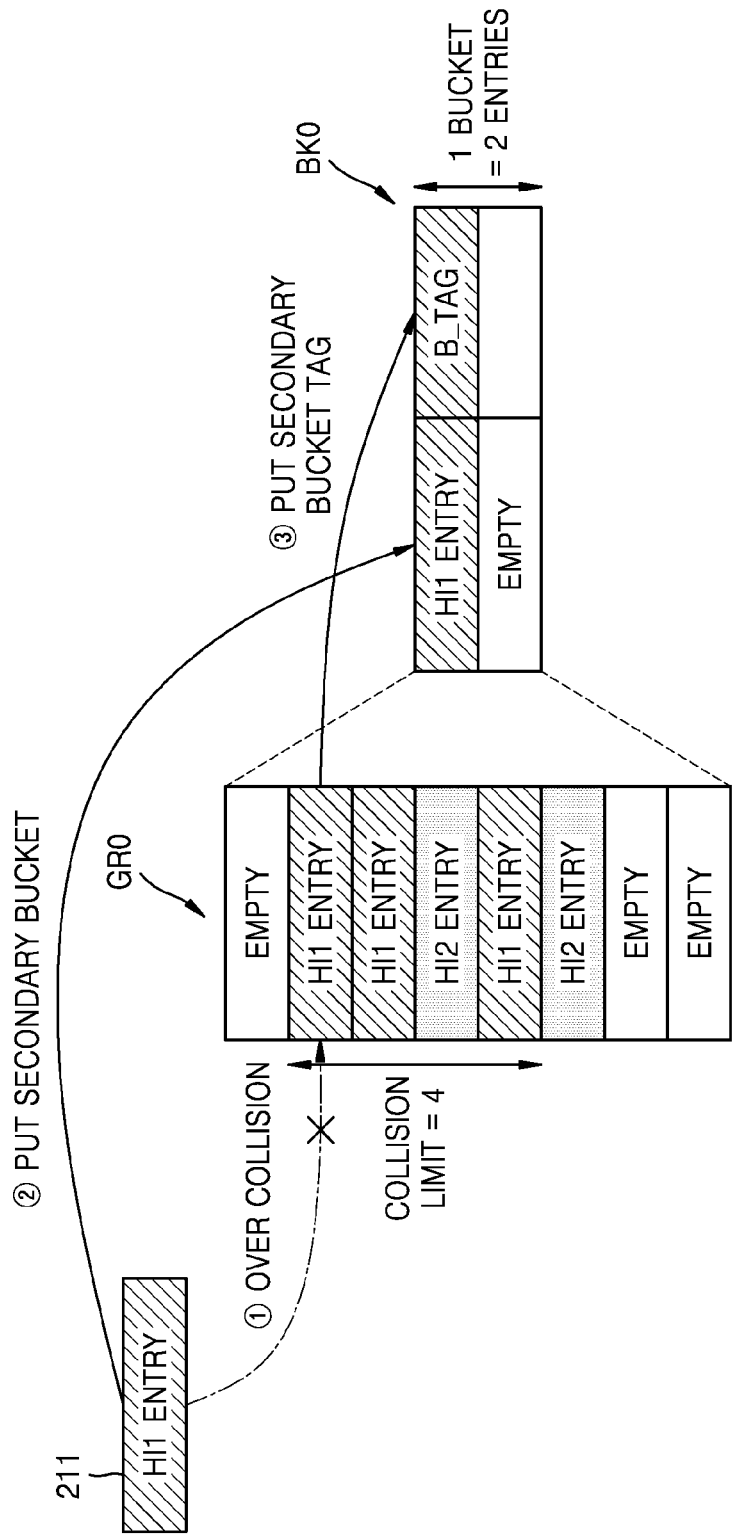
FIG. 21 illustrates an operation of storing mapping information in a bucket, according to an embodiment.

FIG. 21 illustrates an operation of storing mapping information in the first bucket BK0, according to an embodiment.

Referring to FIG. 21, the first group GR0 may include eight hash entries, and a collision limit may be determined to be 4. The collision limit may be a threshold number that is determined in advance. In this case, when four hash entries already correspond to a hash index HI, an over collision may occur in a new hash entry 211 corresponding to the hash index HI. Thus, the new hash entry 211 may be stored in a first bucket entry included in the first bucket BK0 corresponding to the first group GR0. In other words, when a number of hash entries correspond to the same hash index HI (i.e., the same mapping index) and assigned to the first group GR0 is greater than a predetermined threshold for the collision limit, a controller may store the new hash entry 211 in a first bucket entry included in the first bucket BK0. The controller may store new hash entries in this manner to alleviate the condition of the collision limit being met, even for a group among multiple groups. Also, the first bucket entry may further include a bucket tag B_TAG indicating the hash index HI for which the over collision occurs. A hashtag corresponding to the hash index HI in the hash table HT may be set to indicate that the new hash entry 211 corresponding to the hash index HI has been stored in the first bucket BK0.

Figure 22:
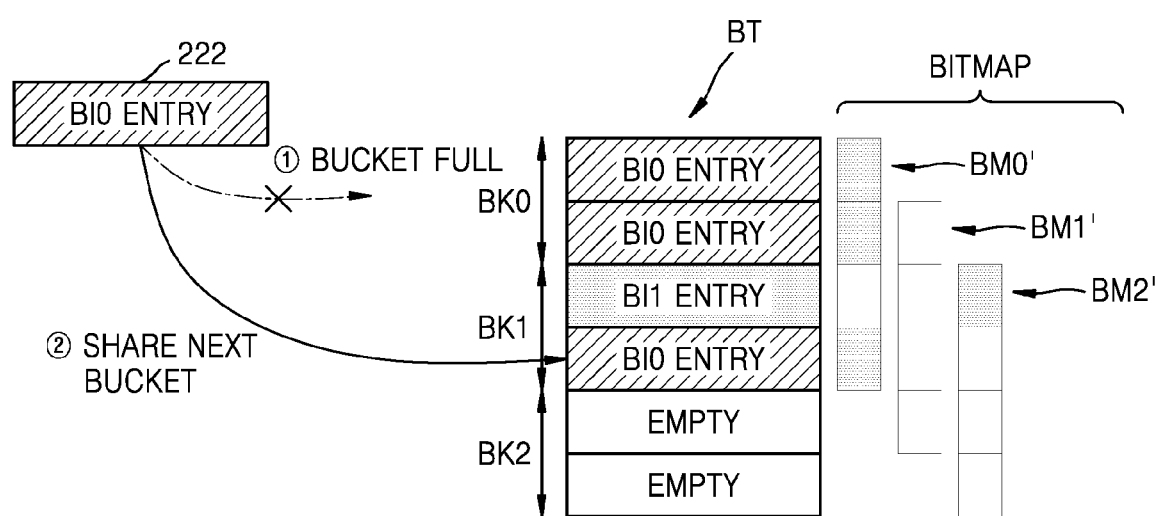
FIG. 22 illustrates a sharing operation between adjacent buckets, according to an embodiment.

FIG. 22 illustrates a sharing operation between adjacent buckets, according to an embodiment.

Referring to FIG. 22, a new bucket entry 222 may be assigned to the first bucket BK0 corresponding to the first group GR0. However, when the first bucket BK0 is full in the bucket table BT, the new bucket entry 222 may be stored in a bucket entry included in a second bucket BK1 adjacent to the first bucket BK0. When the second bucket BK1 is also full, the new bucket entry 222 may be stored in a bucket entry included in a third bucket BK3. A first bitmap BM0' may indicate storage locations of bucket entries assigned to the first bucket BK0. For example, the first bitmap BM0' may be 1101. A third bitmap BM2' may indicate storage locations of bucket entries assigned to the second bucket BK1. For example, the third bitmap BM2' may be 1000.

Figure 23:
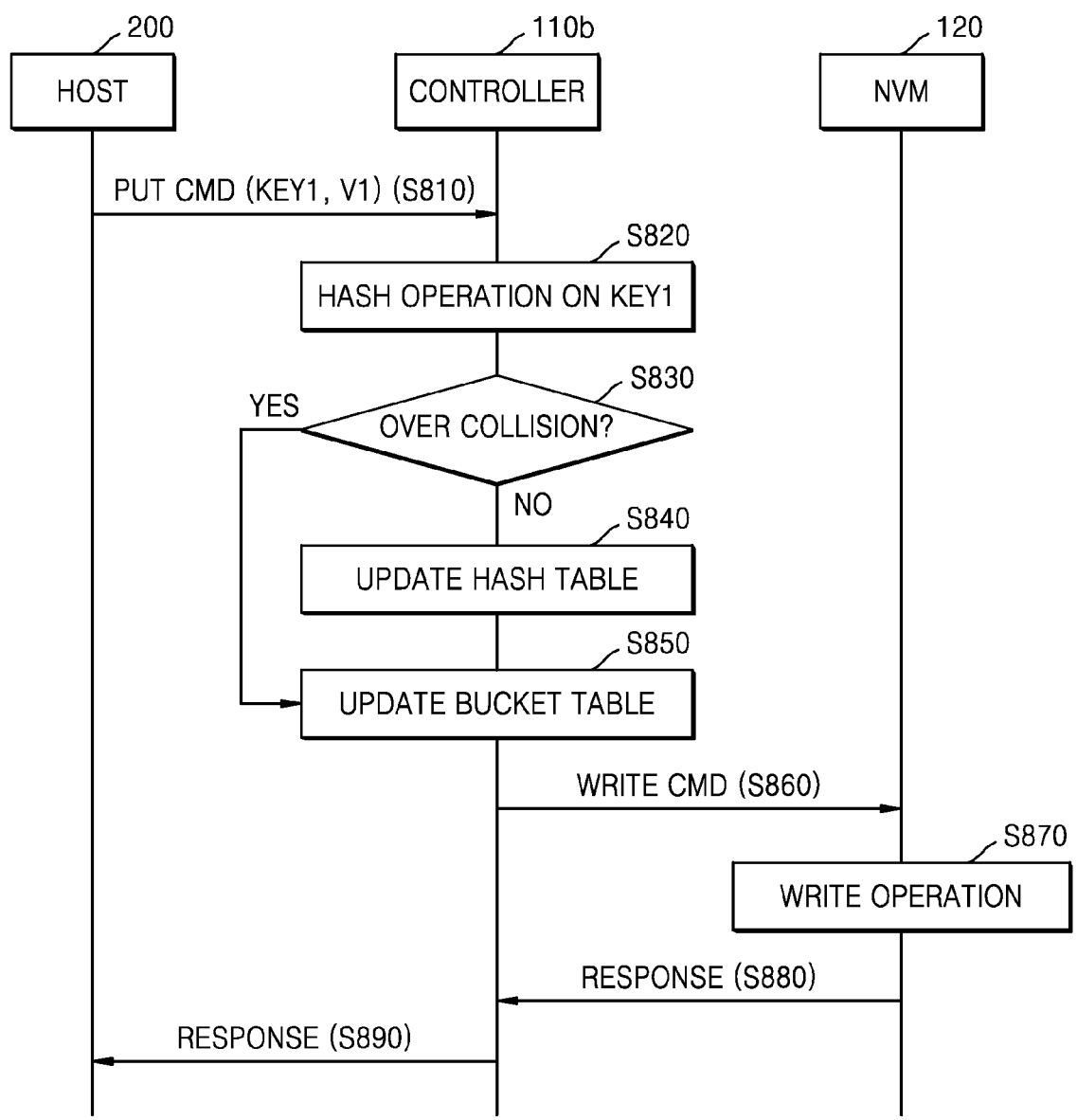
FIG. 23 illustrates a flowchart of a write operation among a host, a controller, and a non-volatile memory, according to an embodiment.

FIG. 23 illustrates a flowchart of a write operation among the host 200, a controller 110b, and the NVM 120, according to an embodiment. Hereinafter, the write operation will be described with reference to FIGS. 15 and 23.

In operation S810, the host 200 transmits, to the controller 110b, a put command PUT CMD including the first key KEY1 and the first value V1. In operation S820, the controller 110b generates a hashed key by performing a hashing operation on the first key KEY1. In operation S830, the controller 110b determines whether an over collision occurs with regard to the generated hashed key. As a result of determination, when an over collision does not occur, mapping information of the first value V1 corresponding to the hashed key is updated to the hash table HT, in operation S840. In this case, operation S850 may not be performed, but operation S860 may be performed after operation S840. In contrast, when an over collision occurs, the mapping information of the first value V1 corresponding to the hashed key is updated to the bucket table BT, in operation S850.

In operation S860, the controller 110b transmits, to the NVM 120, a write command WRITE CMD including the first value V1 and a physical address included in the mapping table stored in the hash table HT or the bucket table BT. In operation S870, the NVM 120 writes the first value V1 on the physical address. In some embodiments, the NVM 120 may further write the first key KEY1 and the hashed key on the physical address. In operation S880, the NVM 120 transmits, to the controller 110b, a response message indicating that the write operation has completed. In operation S890, the controller 110b transmits, to the host 200, the response message indicating that the write operation has completed.

Figure 24:
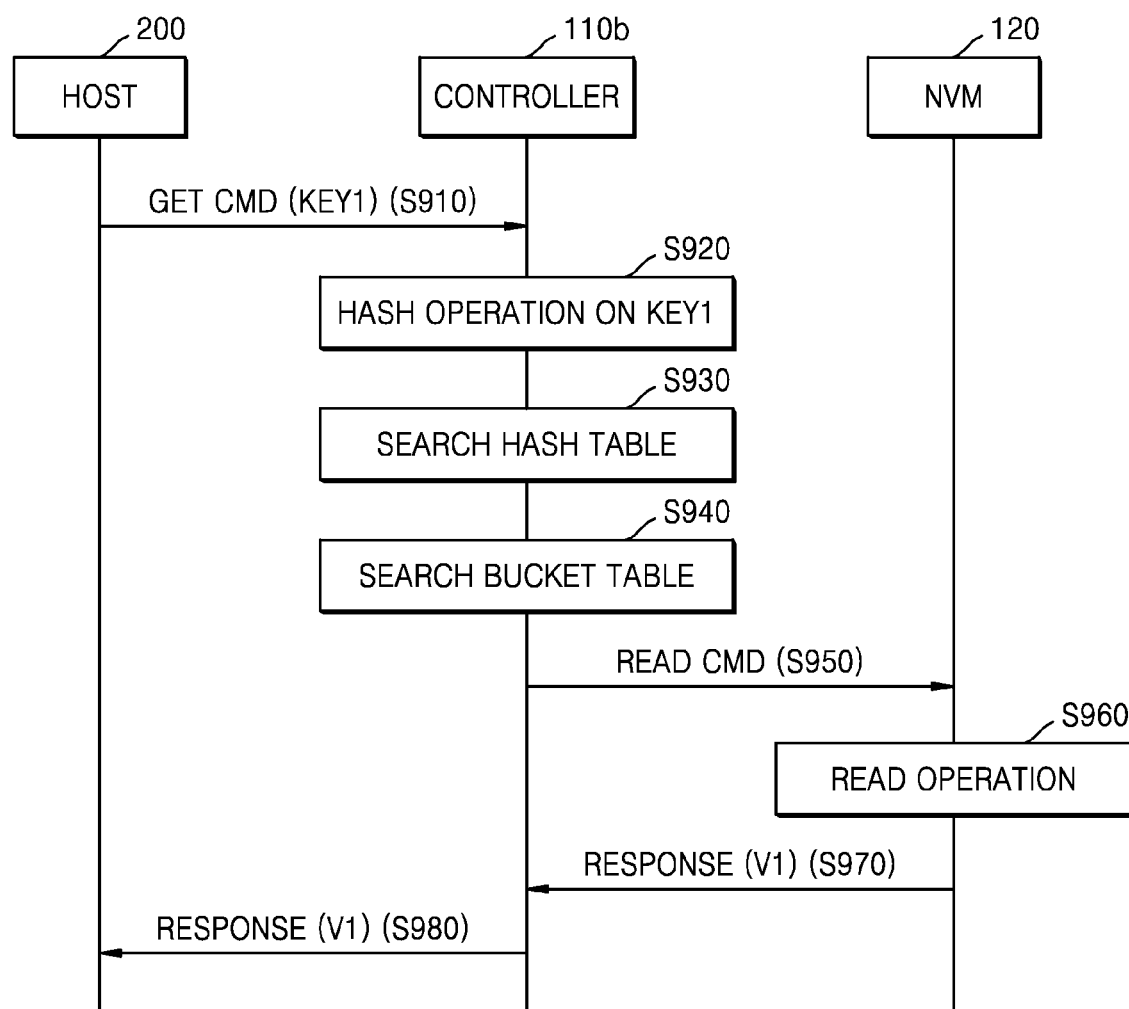
FIG. 24 illustrates a flowchart of a read operation among a host, a controller, and a non-volatile memory, according to an embodiment.

FIG. 24 illustrates a flowchart of a read operation among the host 200, the controller 110b, and the NVM 120, according to an embodiment. Hereinafter, the read operation will be described with reference to FIGS. 15 and 24.

In operation S910, the host 200 transmits a get command GET CMD including the first key KEY1 to the controller 110b. In operation S920, the controller 110b generates the hashed key by performing the hashing operation on the first key KEY1. In operation S930, the controller 110b retrieves a mapping table by using the generated hashed key as a mapping index. As a result of retrieving the mapping table, when a physical address corresponding to the mapping index is found from the mapping table, operation S940 may not be performed, and operation S950 may be performed. When the physical address corresponding to the mapping index is not found from the mapping table, operation S940 may be performed. In operation S940, the controller 110b may retrieve the bucket table BT by using the generated hashed key as the mapping index.

In operation S950, the controller 110b transmits, to the NVM 120, a read command READ CMD including the mapping table retrieved from the hash table HT or the bucket table BT. In operation S960, the NVM 120 reads the first value V1 stored in the physical address corresponding to the mapping information by performing the read operation. In operation S970, the NVM 120 transmits a response message including the first value V1 to the controller 110b. In operation S980, the controller 110b transmits the response message including the first value V1 to the host 200.

Figure 25:
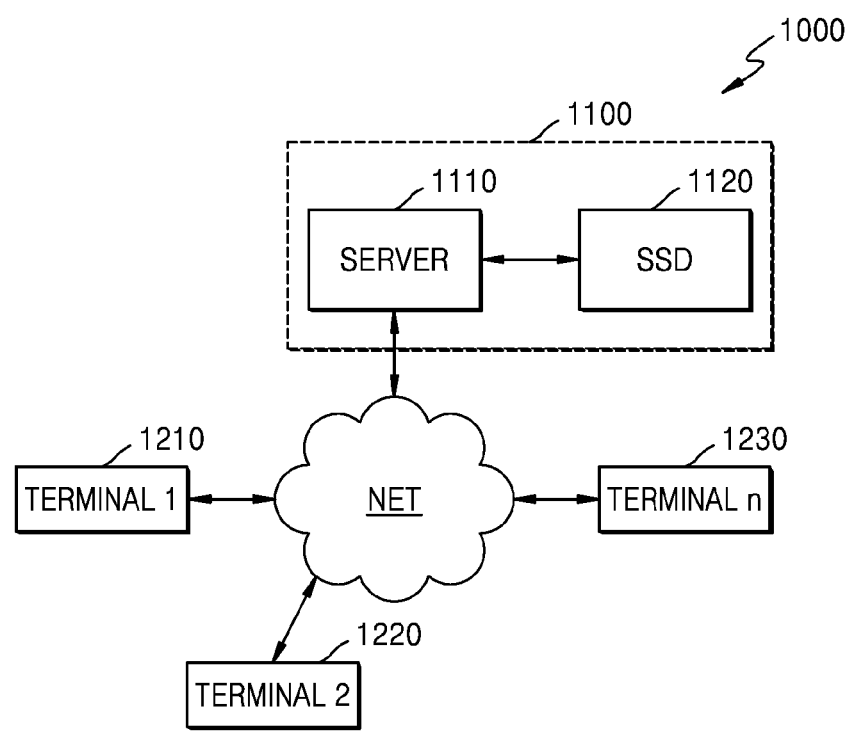
FIGS. 25 and 26 respectively illustrate network systems according to an embodiment.
Figure 26:
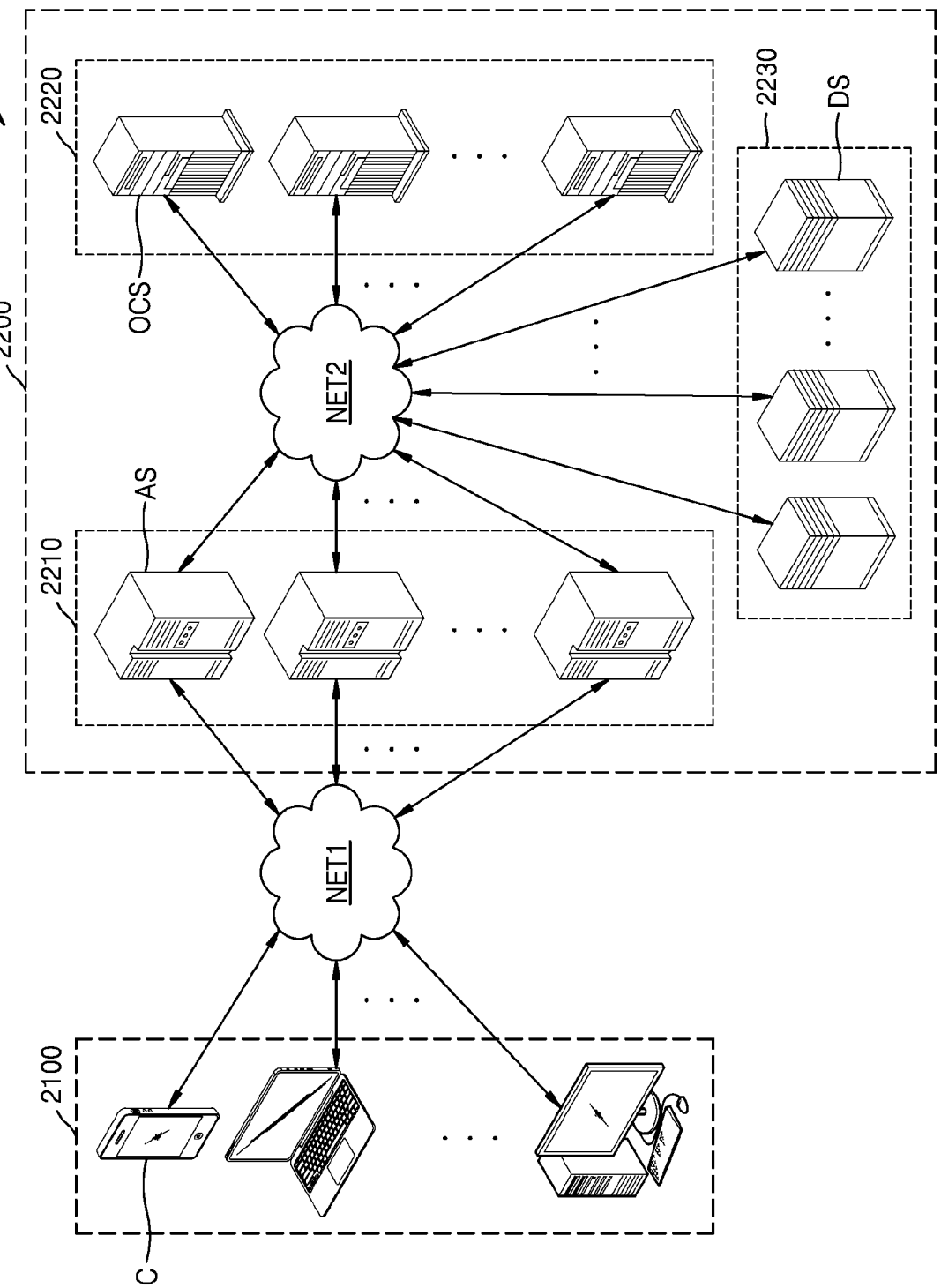

FIGS. 25 and 26 respectively illustrate network systems 1000 and 2000 according to an embodiment.

Referring to FIG. 25, the network system 1000 may include a server system 1100 and terminals 1210 to 1230 (e.g., computing nodes) communicating with the server system 1100 via a network NET. The server system 1100 may include a server 1110 and an SSD 1120. In this case, the server 1110 may correspond to the host 200 or 200a according to the one or more embodiments, and the SSD 1120 may correspond to the storage device 100, the storage device 100a, or the storage device 100b according to the one or more embodiments. In an embodiment, the SSD 1120 may be embodied as an SSD supporting large values based on the one or more embodiments described with reference to FIGS. 1 to 14. In an embodiment, the SSD 1120 may be embodied as an SSD supporting a secondary bucket hash based on the one or more embodiments described with reference to FIGS. 15 to 24.

The server 1110 may process requests from the terminals 1210 to 1230 connected to the network NET. In an embodiment, the server 1110 may transmit, to the SSD 1120, a command including a key, a chunk, and a chunk index. In an embodiment, the SSD 1120 may perform a write operation in units of chunks. In an embodiment, the SSD 1120 may perform a read operation in units of chunks. In an embodiment, the SSD 1120 may store a hash table in the first area of the memory and a bucket table in the second area of the memory. In this case, the size of the first area may be greater than that of the second area. The hash table may include groups each including hash entries. Also, the bucket table may include buckets respectively corresponding to the groups and each including at least one bucket entry.

FIG. 26 illustrates a network system 2000 according to an embodiment.

Referring to FIG. 26, the network system 2000 may include a client group 2100 and a data center 2200. The client group 2100 may include client devices C communicating with the data center 2200 via a first network NET1, e.g., the Internet. The data center 2200 may be a facility collecting various types of data and providing services and may include an application server group 2210, a database server group 2220, and an object cache server group 2230 communicating with each other via a second network NET2, e.g., a Local Area Network (LAN) or Intranet.

The application server group 2210 may include application server devices AS, and the application server devices AS may process requests from the client group 2100 and access the database server group 2220 or the object cache server group 2230 in response to the requests from the client group 2100. The database server group 2220 may include database server devices DS storing data processed by the application server devices AS. The object cache server group 2230 may include object cache server devices OCS temporarily storing data that is stored in the database server devices DS or read therefrom, and thus the object cache server group 2230 may perform functions of a cache between the application server devices AS and the database server devices DS. In an embodiment, the object cache server device OCS may be a key-value storage device supporting a large value and may be embodied based on the one or more embodiments described with reference to FIGS. 1 to 14. In an embodiment, the object cache server device OCS may be a key-value storage device supporting a secondary bucket hash and may be embodied based on the one or more embodiments described with reference to FIGS. 15 to 24.

Figure 27:
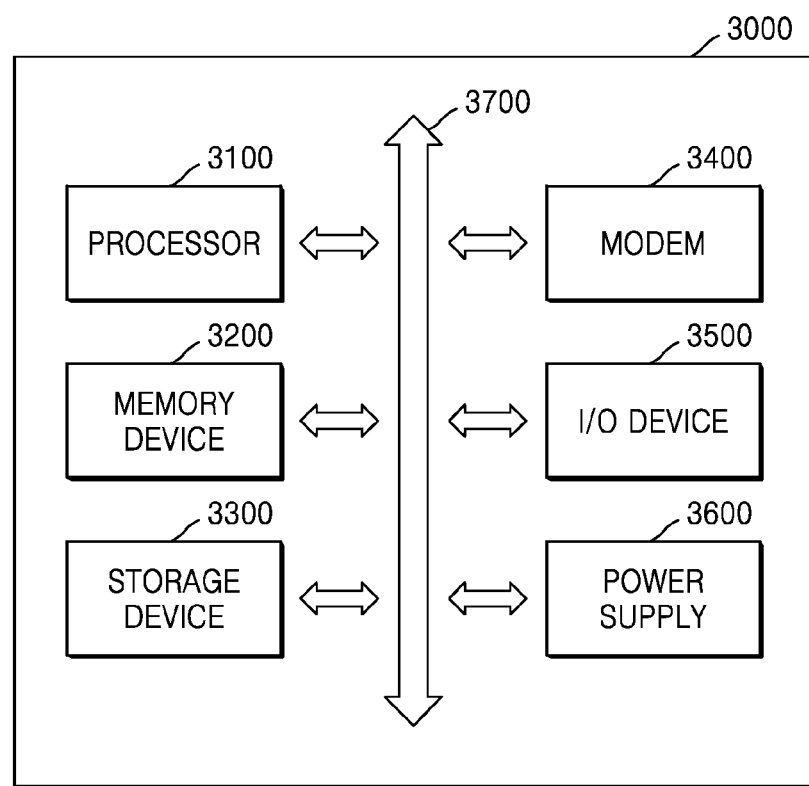
FIG. 27 illustrates a block diagram of an electronic device according to an embodiment.

FIG. 27 illustrates a block diagram of an electronic device 3000 according to an embodiment.

Referring to FIG. 27, the electronic device 3000 may include a processor 3100, a memory device 3200, a storage device 3300, a modem 3400, an input/output (I/O) device 3500, and a power supply 3600. In an embodiment, the storage device 3300 may be a key-value storage device supporting a large value and may be embodied based on the one or more embodiments described with reference to FIGS. 1 to 14. In an embodiment, the storage device 3300 may be a key-value storage device supporting a secondary bucket hash and may be embodied based on the one or more embodiments described with reference to FIGS. 15 to 24.

While inventive concepts of the present disclosure have been particularly shown and described with reference to embodiments thereof, it will be understood that various changes in form and details may be made therein without departing from the spirit and scope of the following claims.

What is claimed is:

1. A key-value storage device configured to communicate with a host, the key-value storage device comprising:
   a non-volatile memory; and
   a controller configured to
      receive, from the host, a first command comprising a key, a first chunk among a plurality of chunks comprised in a value corresponding to the key, and a first chunk index among a plurality of chunk indices, corresponding to the first chunk,
      calculate a distance between two adjacent mapping indices respectively corresponding to two adjacent chunks among the plurality of chunks, based on a maximum value of a mapping index of a mapping table and a maximum chunk count of the plurality of chunks,
      generate a first mapping index of the first chunk based on the first chunk index, the distance, and a hashed key generated based on the key, and
      store, in the mapping table, a first physical address used to write the first chunk on the non-volatile memory based on the first mapping index;
   wherein the non-volatile memory is configured to store the key and the first chunk based on the first physical address,
   wherein a size of the value is greater than a size of the first physical address,
   a size of the first chunk is less than or equal to the size of the first physical address, and
   the plurality of chunk indices respectively corresponds to the plurality of chunks.

2. The key-value storage device of claim 1, wherein the mapping table comprises a hash table and a bucket table,
   the hash table comprises a plurality of groups each comprising a plurality of hash entries,
   the bucket table respectively corresponds to the plurality of groups and comprises at least one bucket entry, and
   a size of the hash table is greater than a size of the bucket entry.

3. The key-value storage device of claim 2, wherein the controller is further configured to, when a number of hash entries corresponding to a first hash index and assigned to a first group among a plurality of groups is greater than a threshold number that is determined in advance, store a new hash entry, corresponding to the first hash index and assigned to the first group, in a first bucket corresponding to the first group, the first bucket being selected from among a plurality of buckets in the bucket table and respectively corresponding to the plurality of groups.

4. A method of operating a key-value storage device comprising a non-volatile memory and a controller configured to control the non-volatile memory, the method comprising:
   receiving, from a host, a first command comprising a key, a first chunk among a plurality of chunks comprised in a value corresponding to the key, and a first chunk index among a plurality of chunk indices, corresponding to the first chunk, wherein the receiving is performed by the controller;

calculating a distance between two adjacent mapping indices respectively corresponding to two adjacent chunks among the plurality of chunks, based on a maximum value of a mapping index of a mapping table and a maximum chunk count of the plurality of chunks, generating, in response to the first command, a first mapping index for storing mapping information of the first chunk based on the first chunk index, the distance, and a hashed key which corresponds to the key and is generated based on the key, wherein the generating is performed by the controller;

storing, in the mapping table, a first physical address used to write the first chunk on the non-volatile memory according to the first mapping index, wherein the storing is performed by the controller; and writing the first chunk on the first physical address of the non-volatile memory by referring to the mapping table, wherein the generating of the first mapping index comprises:

generating the hashed key corresponding to the key; and
determining the first mapping index based on the generated hashed key and the first chunk index, and wherein a size of the value is greater than a size of the first physical address, a size of the first chunk is less than or equal to the size of the first physical address, and the plurality of chunk indices respectively corresponds to the plurality of chunks.

5. The method of claim 4, further comprising, after the receiving of the first command from the host is performed:

receiving, from the host, a second command comprising the key, a second chunk among the plurality of chunks, and a second chunk index corresponding to the second chunk, wherein the receiving is performed by the controller;

generating a second mapping index for storing mapping information of the second chunk based on the key and the second chunk index, in response to the second command, wherein the generating is performed by the controller.

6. The method of claim 5, wherein the generating of the second mapping index comprises:

calculating a distance between two adjacent mapping indices respectively corresponding to two adjacent chunks among the plurality of chunks, based on a maximum value of a mapping index of the mapping table and a maximum chunk count of the plurality of chunks; and determining the second mapping index to correspond to a sum of the first mapping index and the distance.

7. The method of claim 4, wherein the key-value storage device further comprises a memory to which the mapping table is loaded.

8. The method of claim 7, wherein the memory comprises a first area where the mapping table is loaded, and a second area where a plurality of buckets are loaded, the mapping table comprises a plurality of groups each comprising a plurality of hash entries, the plurality of buckets respectively correspond to the plurality of groups, and the method further comprises, when a number of hash entries assigned to the first mapping index among the plurality of hash entries is greater than a threshold number, storing the first physical address in a first bucket among the plurality of buckets.

* * * * *